(12) United States Patent
Um et al.

(10) Patent No.: US 10,110,428 B2
(45) Date of Patent: Oct. 23, 2018

(54) METHOD AND APPARATUS FOR CONFIGURING FRAME OF UNLICENSED BAND

(71) Applicant: Electronics and Telecommunications Research Institute, Daejeon (KR)

(72) Inventors: Jung Sun Um, Daejeon (KR); Sungjin Yoo, Daejeon (KR); Hoiyoon Jung, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 82 days.

(21) Appl. No.: 15/274,553

(22) Filed: Sep. 23, 2016

(65) Prior Publication Data

US 2017/0093620 A1 Mar. 30, 2017

(30) Foreign Application Priority Data

Sep. 24, 2015 (KR) .................. 10-2015-0135498
Oct. 13, 2015 (KR) .................. 10-2015-0142980
Aug. 5, 2016 (KR) .................. 10-2016-0100147

(51) Int. Cl.
*H04L 12/24* (2006.01)
*H04L 5/00* (2006.01)
*H04W 56/00* (2009.01)
*H04L 12/28* (2006.01)
*H04W 16/14* (2009.01)

(52) U.S. Cl.
CPC ........ *H04L 41/0803* (2013.01); *H04L 5/0048* (2013.01); *H04L 12/28* (2013.01); *H04W 16/14* (2013.01); *H04W 56/001* (2013.01)

(58) Field of Classification Search
CPC ............ H04L 41/0803; H04L 5/0048; H04W 56/001; H04W 16/14
USPC .................. 370/230–254, 328–352
See application file for complete search history.

(56) References Cited

U.S. PATENT DOCUMENTS

| | | | |
|---|---|---|---|
| 8,787,216 B2 | 7/2014 | Yoon et al. | |
| 9,225,497 B2 | 12/2015 | Yang et al. | |
| 9,226,293 B2 | 12/2015 | Yang et al. | |
| 9,331,826 B2 * | 5/2016 | Kim | ........................ H04L 5/001 |
| 9,344,245 B2 | 5/2016 | Yoon et al. | |
| 9,509,479 B2 * | 11/2016 | Yi | ......................... H04W 52/48 |
| 9,854,596 B2 * | 12/2017 | Calcev | ............. H04W 72/1231 |
| 2013/0003639 A1 | 1/2013 | Noh et al. | |
| 2013/0201975 A1 | 8/2013 | Chen et al. | |
| 2015/0023315 A1 | 1/2015 | Yerramalli et al. | |
| 2015/0146604 A1 | 5/2015 | Kim et al. | |
| 2015/0201431 A1 | 7/2015 | Um et al. | |

(Continued)

FOREIGN PATENT DOCUMENTS

| | | |
|---|---|---|
| KR | 1020110132180 A | 12/2011 |
| KR | 1020130043600 A | 4/2013 |
| KR | 1020140107273 A | 9/2014 |

*Primary Examiner* — Man U Phan
(74) *Attorney, Agent, or Firm* — William Park & Associates Ltd.

(57) ABSTRACT

A communication node configures an unlicensed band transmission burst including a plurality of subframes in consideration of an occupancy state of a channel of an unlicensed band and transmits the unlicensed band transmission burst through the unlicensed band. In this case, at least one subframe of the plurality of subframes has a different type from the remaining subframes.

17 Claims, 18 Drawing Sheets

(56) References Cited

U.S. PATENT DOCUMENTS

| | | | |
|---|---|---|---|
| 2016/0050667 A1* | 2/2016 | Papasakellariou | H04W 74/0808 370/329 |
| 2016/0073386 A1 | 3/2016 | Yang et al. | |
| 2016/0254891 A1 | 9/2016 | Yoon et al. | |
| 2016/0302180 A1* | 10/2016 | Nory | H04L 27/2601 |
| 2016/0345206 A1* | 11/2016 | Yerramalli | H04W 28/12 |
| 2017/0019909 A1* | 1/2017 | Si | H04W 76/048 |
| 2017/0034670 A1* | 2/2017 | Zhang | H04W 4/06 |
| 2017/0126300 A1* | 5/2017 | Park | H04B 7/0626 |
| 2017/0142743 A1* | 5/2017 | Yoon | H04L 5/0048 |
| 2017/0289818 A1* | 10/2017 | Ng | H04W 16/14 |
| 2017/0311322 A1* | 10/2017 | Kim | H04W 72/0446 |

* cited by examiner

METHOD AND APPARATUS FOR CONFIGURING FRAME OF UNLICENSED BAND

CROSS-REFERENCE TO RELATED APPLICATION

This application claims priority to and the benefit of Korean Patent Application Nos. 10-2015-0135498, 10-2015-0142980, and 10-2016-0100147 filed in the Korean Intellectual Property Office on Sep. 24, 2015, Oct. 13, 2015, and Aug. 5, 2016, the entire contents of which are incorporated herein by reference.

BACKGROUND OF THE INVENTION (a) Field of the Invention

The present invention relates to a method and apparatus for configuring a frame of an unlicensed band, and more particularly, to a technology of flexibly configuring a frame structure of an unlicensed band cell and signaling the configured frame structure.

(b) Description of the Related Art

With the development of information communication technologies, various wireless communication technologies have been developed. The wireless communication technology may be largely classified into a wireless communication technology using a licensed band, a wireless communication technology using an unlicensed band (for example, industrial scientific medical (ISM) band), or the like depending on a use band. A use right of the licensed band is exclusively assigned to one operator, and therefore the wireless communication technology using the licensed band may provide more excellent reliability, communication quality, or the like than the wireless communication technology using the unlicensed band.

As the representative wireless communication technologies using the licensed band, there is long term evolution (LTE), or the like defined in the 3rd generation partnership project (3GPP) standard. Here, a base station (nodeB (NB)) and user equipment (UE) that support the LTE may each transmit and receive a signal through the licensed band.

As the representative wireless communication technologies using the unlicensed band, there is a wireless local area network (WLAN), or the like defined in the IEEE 802.11 standard. Here, an access point (AP) and a station (STA) that support the WLAN may each transmit and receive a signal through the unlicensed band.

Meanwhile, mobile traffic has grown explosively in recent years. Therefore, there is a need to additionally secure the licensed band to process the mobile traffic through the licensed band. However, the licensed band is finite and the licensed band may be secured by a frequency band auction among operators, or the like. Therefore, it may cost the operators a lot of money to secure the additional licensed band. To solve the problem, a method for providing an LTE service through an unlicensed band may be considered.

An unlicensed band cell configured of the unlicensed band has different features from the existing licensed band cell. The unlicensed band cell opportunistically occupies a channel and therefore cannot continuously occupy a channel for a predetermined time or more. Further, unlike the licensed band, the unlicensed band cell does not have a backward compatibility problem, and as a result can configure a subframe having a new structure. Accordingly, the frame structure of the unlicensed band cell may be differently configured from the licensed band.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for configuring a frame of an unlicensed band having advantages of providing a service of a licensed band through the unlicensed band.

Further, the present invention has been made in an effort to provide a method and apparatus for configuring a frame of an unlicensed band having advantages of providing signaling to enable a terminal to recognize the frame structure of the unlicensed band.

An exemplary embodiment of the present invention provides a method for configuring a frame of an unlicensed band at a communication node. The method includes: configuring an unlicensed band transmission burst in consideration of an occupancy state of a channel of the unlicensed band; and transmitting the unlicensed band transmission burst through the unlicensed band, in which the unlicensed band transmission burst includes a plurality of continuous subframes and at least one of the plurality of subframes is a subframe of a different type from the remaining subframes.

The method may further include: adding an unlicensed band signal to a start location of the unlicensed band transmission burst.

The at least one subframe may include a partial subframe having a time length shorter than that of the remaining subframes.

The remaining subframes may include a plurality of symbols in a time domain, and the partial subframe may not transmit a signal for a part of first or last time in the time length of the remaining subframes.

The at least one subframe may be an uplink subframe and the remaining subframes may be a downlink subframe.

The at least one subframe may include a subframe in which a symbol in which a cell-specific reference signal (CRS) is present and a symbol in which the cell-specific reference signal (CRS) is not present are mixed.

The at least one subframe may include a subframe in which an unlicensed band discovery reference signal (DRS) is multiplexed with a physical downlink shared channel (PDSCH).

The at least one subframe may include an uplink subframe consisting of only a physical uplink control channel (PUCCH).

The at least one subframe may include a subframe in which primary synchronization signal (PSS)/a secondary synchronization signal (SSS) are included.

The method may further include signaling information of subframes configuring the unlicensed band transmission burst.

The information may include at least one of the number of symbols including CRS configured in the subframe, information on a last subframe of the unlicensed band transmission burst, the number of symbols configuring a partial subframe, the number of subframes of the unlicensed band transmission burst, the number of subframes in which a control channel region is not monitored after the unlicensed band transmission burst currently transmitted expires, the number of remaining subframes of an unlicensed band transmission burst currently transmitted, the number of subframes of a subsequent unlicensed band transmission burst, whether a channel state information-reference signal (CSI-RS)/channel state information-interference measurement (CSI-IM) is configured, and transmit power of the CRS/CSI-RS.

The signaling may include transmitting the information using at least one of a physical HARQ indicator channel (PHICH) defined for uplink hybrid automatic repeat reQuest feedback, an unlicensed cell-radio network temporary identifier (U-RNTI) associated with an unlicensed band cell, and downlink control information (DCI).

The signaling may include transmitting the information by a combination of at least one of a PHICH group, a PHICH sequence, and a PHICH information bit.

Another exemplary embodiment of the present invention provides an apparatus for configuring a frame of an unlicensed band at a communication node. The apparatus for configuring a frame of an unlicensed band includes a processor and a transmitting/receiving device. The processor may assess an occupancy state of a channel of the unlicensed band to configure an unlicensed band transmission burst continuously transmitting a plurality of subframes and generate signaling information for informing information of subframes of the unlicensed band transmission burst. The transmitting/receiving device may be connected to a network to transmit the unlicensed band transmission burst and signaling information At least one of the plurality of subframes may be a subframe of a different type from the remaining subframes.

The at least one subframe may include a downlink subframe including a synchronization signal and the remaining subframes may include a downlink subframe not including the synchronization signal.

The at least one subframe may include a downlink subframe in which an unlicensed band discovery reference signal (DRS) is multiplexed with a physical downlink shared channel (PDSCH) and the remaining subframes may include a downlink subframe not including a synchronization signal.

The at least one subframe may be an uplink subframe and the remaining subframes may be a downlink subframe.

The at least one subframe may include a partial subframe having a time length shorter than that of the remaining subframes.

The signaling information may include at least one of the number of symbols including a cell-specific reference signal (CRS) configured in the subframe, information on a last subframe of the unlicensed band transmission burst, the number of symbols configuring a partial subframe, the number of subframes of the unlicensed band transmission burst, the number of subframes in which a control channel region is not monitored after the unlicensed band transmission burst currently transmitted expires, the number of remaining subframes of an unlicensed band transmission burst currently transmitted, the number of subframes of a subsequent unlicensed band transmission burst, whether a channel state information-reference signal (CSI-RS)/channel state information-interference measurement (CSI-IM) is configured, and transmit power of the CRS/CSI-RS.

The processor may generate the signaling information using at least one of a physical HARQ indicator channel (PHICH) defined for uplink hybrid automatic repeat reQuest feedback, an unlicensed cell-radio network temporary identifier (U-RNTI) associated with an unlicensed band cell, and downlink control information (DCI).

DETAILED DESCRIPTION OF THE EMBODIMENTS

Figure 1:
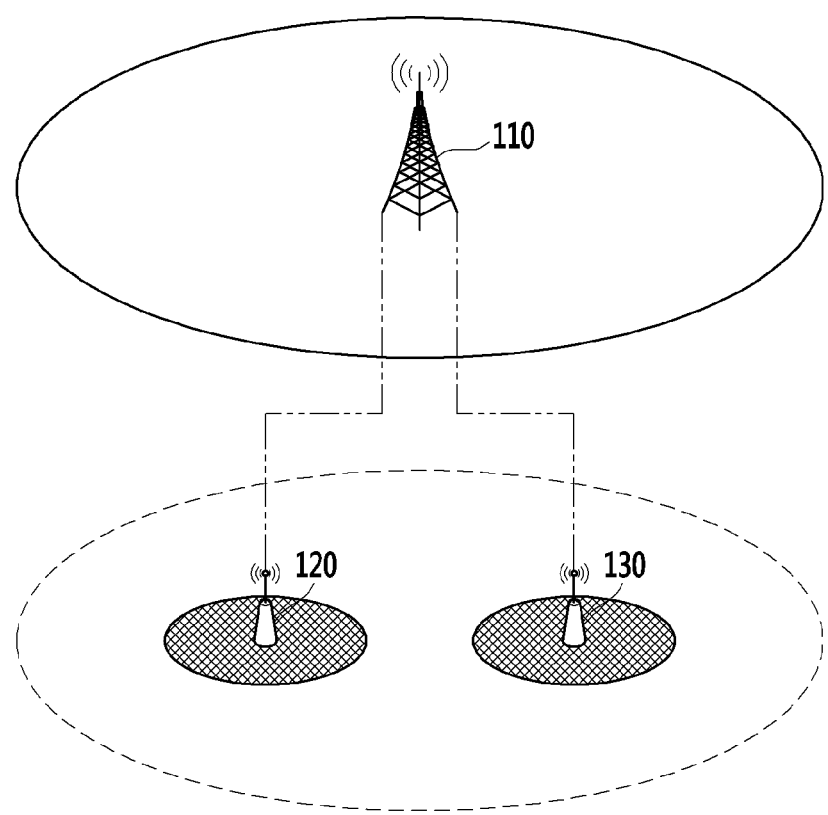
FIG. 1 is a diagram illustrating an example of a wireless communication network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" any components will be understood to imply the inclusion of other elements rather than the exclusion of any other elements.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may also include all or some of the functions of the MT, the MS, the AMS, the HR-MS, the SS, the PSS, the AT, the UE, and the like Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femoto BS), a home node B (HNB), a home eNodeB (HeNB), a pico base station (pico BS), a metro base station (metro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

Hereinafter, a method and an apparatus for configuring a frame of an unlicensed band according to an exemplary embodiment of the present invention will be described in detail with reference to the accompanying drawings.

First, a wireless communication network according to an exemplary embodiment of the present invention will be described, and exemplary embodiment of the present invention is not limited to a wireless communication network to be described below but may be applied to various kinds of wireless communication networks.

FIG. 1 is a diagram illustrating an example of a wireless communication network according to an exemplary embodiment of the present invention.

Referring to FIG. 1, a first base station 110 may support cellular communications [for example, long term evolution (LTE), LTE-advanced (LTE-A), LTE-unlicensed (LTE-U), or the like defined the 3rd generation partnership project (3GPP) standard]. The first base station 110 may support multiple input multiple output (MIMO) (e.g., single user (SU)-MIMO, multi user (MU)-MIMO, massive MIMO, or the like), coordinated multipoint (CoMP), carrier aggregation (CA), or the like. The first base station 110 may be operated in a licensed band F1 and may form a macro cell. The first base station 110 may be connected to other base stations, for example, a second base station 120, a third base station 130, or the like through an ideal backhaul or a non-ideal backhaul.

The second base station 120 may be located within a coverage of the first base station 110. The second base station 120 may be operated in an unlicensed band F3 and may form a small cell. The third base station 130 may be located within the coverage of the first base station 110. The third base station 130 may be operated in the unlicensed band F3 and may form the small cell. The second base station 120 and the third base station 130 may each support a wireless local area network (WLAN) defined in the institute of electrical and electronics engineers (IEEE) 802.11 standard. The first base station 110 and a terminal (not shown) connected to the first base station 110 may each transmit/receive a signal through a CA between the licensed band F1 and the unlicensed band F3.

Figure 2:
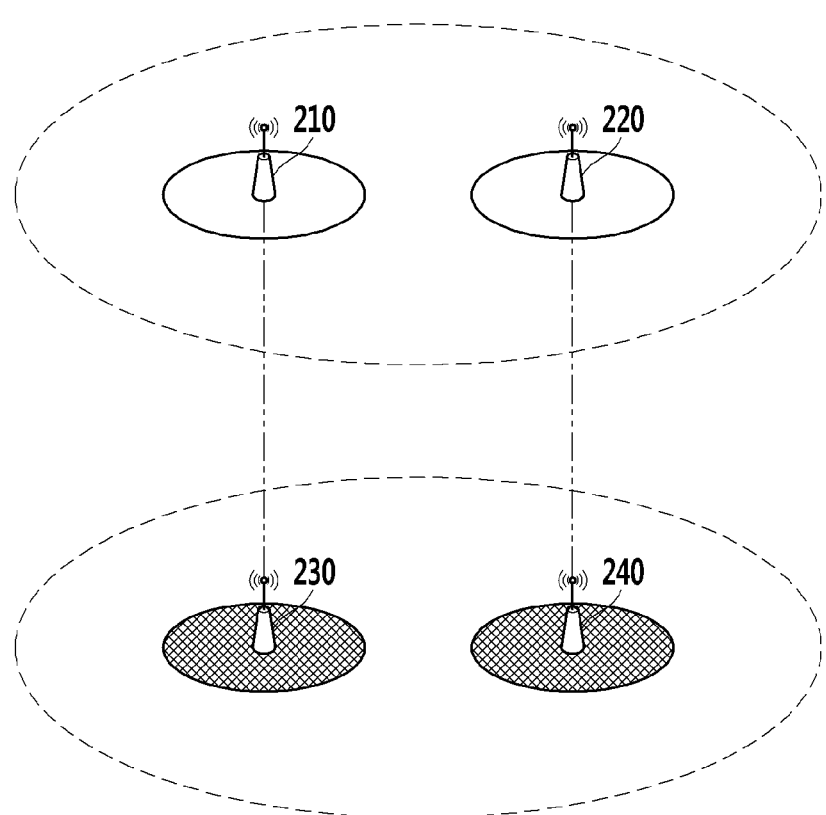
FIG. 2 is a diagram illustrating another example of a wireless communication network according to an exemplary embodiment of the present invention.

FIG. 2 is a diagram illustrating another example of a wireless communication network according to an exemplary embodiment of the present invention.

Referring to FIG. 2, a first base station 210 and a second base station 220 may each support the cellular communications. The first base station 210 and the second base station 220 may each support the MIMO (e.g., SU-MIMO, MU-MIMO, massive MIMO, or the like), the CoMP, the CA, or the like. The first base station 210 and the second base station 220 may each be operated in the licensed band F1 and may form the small cell. The first base station 210 and the second base station 220 may each located within a coverage of the base station that forms the macro cell. The first base station 210 may be connected to a third base station 230 through the ideal backhaul or the non-ideal backhaul. The second base station 220 may be connected to a fourth base station 240 through the ideal backhaul or the non-ideal backhaul.

The third base station 230 may be located within the coverage of the first base station 210. The third base station 230 may be operated in the unlicensed band F3 and may form the small cell. The fourth base station 240 may be located within the coverage of the second base station 220. The fourth base station 240 may be operated in the unlicensed band F3 and may form the small cell. The third base station 230 and the fourth base station 240 may each support the WLAN defined in the IEEE 802.11 standard. The first base station 210, a terminal connected to the first base station 210, the second base station 220, and a terminal connected to the second base station 220 may each transmit/receive a signal through the CA between the licensed band F1 and the unlicensed band F3.

Figure 3:
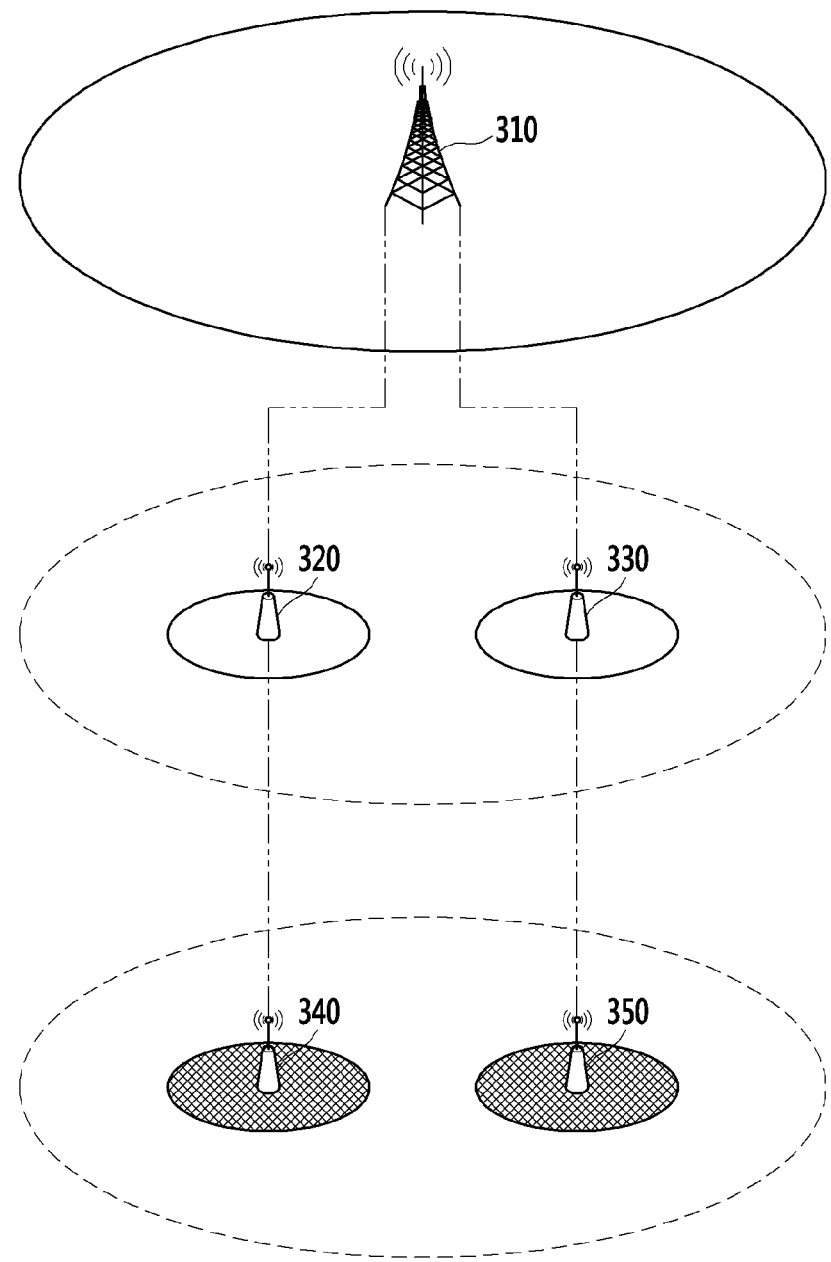
FIG. 3 is a diagram illustrating still another example of a wireless communication network according to an exemplary embodiment of the present invention.

FIG. 3 is a diagram illustrating still another example of a wireless communication network according to an exemplary embodiment of the present invention.

Referring to FIG. 3, a first base station 310, a second base station 320, and a third base station 330 may each support the cellular communications. The first base station 310, the second base station 320, and the third base station 330 may each support the MIMO, the CoMP, the CA, or the like. The first base station 310 may be operated in the unlicensed band F1 and may form the macro cell. The first base station 310 may be connected to other base stations, for example, the second base station 320, the third base station 330, or the like through the ideal backhaul or the non-ideal backhaul. The second base station 320 may be located within a coverage of the first base station 310. The second base station 320 may be operated in the licensed band F1 and may form the small cell. The third base station 330 may be located within the coverage of the first base station 310. The third base station 330 may be operated in the licensed band F1 and may form the small cell.

The second base station 320 may be connected to a fourth base station 340 through the ideal backhaul or the non-ideal backhaul. The fourth base station 340 may be located within the coverage of the second base station 320. The fourth base station 340 may be operated in the unlicensed band F3 and may form the small cell. The third base station 330 may be connected to a fifth base station 350 through the ideal backhaul or the non-ideal backhaul. The fifth base station 350 may be located within a coverage of the third base station 330. The fifth base station 350 may be operated in the unlicensed band F3 and may form the small cell. The fourth base station 340 and the fifth base station 350 may each support the WLAN defined in the IEEE 802.11 standard.

The first base station 310, a terminal (not shown) connected to the first base station 310, the second base station 320, a terminal (not shown) connected to the second base station 320, the third base station 330, and a terminal (not shown) connected to the third base station 330 may each transmit/receive a signal through the CA between the licensed band F1 and the unlicensed band F3.

Figure 4:
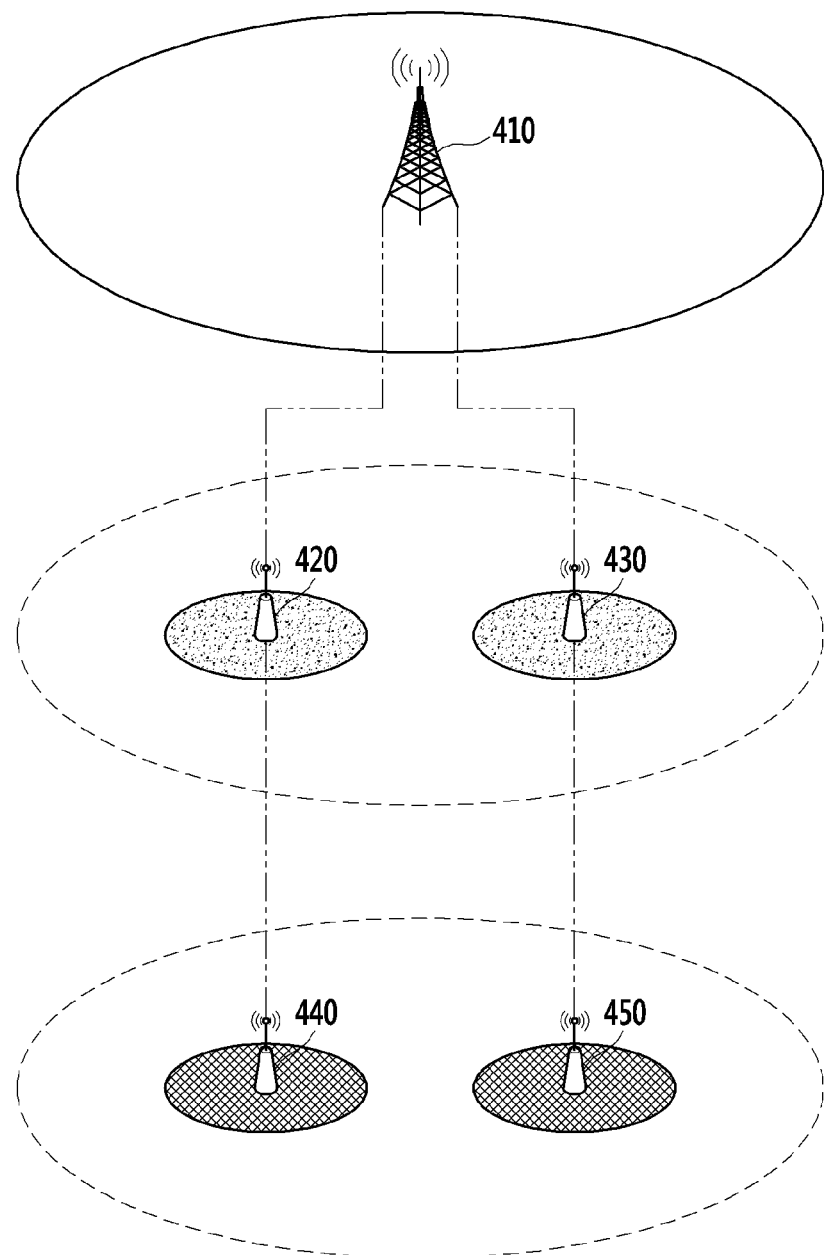
FIG. 4 is a diagram illustrating yet another example of a wireless communication network according to an exemplary embodiment of the present invention.

FIG. 4 is a diagram illustrating yet another example of a wireless communication network according to an exemplary embodiment of the present invention.

Referring to FIG. 4, a first base station 410, a second base station 430, and a third base station 430 may each support the cellular communications. The first base station 410, the second base station 420, and the third base station 430 may each support the MIMO, the CoMP, the CA, or the like. The first base station 410 may be operated in the licensed band F1 and may form the macro cell. The first base station 410 may be connected to other base stations, for example, the second base station 420, the third base station 430, or the like through the ideal backhaul or the non-ideal backhaul. The second base station 420 may be located within a coverage of the first base station 410. The second base station 420 may be operated in the licensed band F2 and may form the small cell. The third base station 430 may be located within the coverage of the first base station 410. The third base station 430 may be operated in the licensed band F2 and may form the small cell. The second base station 420 and the third base station 430 may each be operated in a licensed band F2 different from the licensed band F1 in which the first base station 410 is operated.

The second base station 420 may be connected to a fourth base station 440 through the ideal backhaul or the non-ideal backhaul. The fourth base station 440 may be located within a coverage of the second base station 420. The fourth base station 440 may be operated in the unlicensed band F3 and may form the small cell. The third base station 430 may be connected to a fifth base station 450 through the ideal backhaul or the non-ideal backhaul. The fifth base station 450 may be located within a coverage of the third base station 430. The fifth base station 450 may be operated in the unlicensed band F3 and may form the small cell. The fourth base station 440 and the fifth base station 450 may each support the WLAN defined in the IEEE 802.11 standard.

The first base station 410 and a terminal (not shown) connected to the first base station 410 may each transmit/receive a signal through the CA between the licensed band F1 and the unlicensed band F3. The second base station 420, a terminal (not shown) connected to the second base station 420, a third base station 430, and a terminal (not shown) connected to the third base station 220 may each transmit/receive a signal through the CA between the licensed band F2 and the unlicensed band F3.

Communication nodes, i.e. the base station, the terminal, or the like that configure the wireless communication network described above may transmit a signal in the unlicensed band on the basis of a listen before talk (LBT) procedure. According to the LBT, the communication node performs an energy detection operation to assess an occupancy state of a channel of the unlicensed band and transmits a signal if it is determined that the channel is in an idle state. In this case, the communication node may transmit a signal when the channel is in the idle state during a contention window according to a random backoff operation. On the other hand, the communication node may not transmit a signal if it is determined that the channel is in a busy state. A basic unit of a clear channel assessment (CCA) may be defined by a slot. The communication node may assess the occupancy state of the channel during a fixed-length CCA or the fixed number of slots to occupy the channel when the channel is in the idle state. Unlike this, the communication node may randomly select a positive integer and assess the occupancy state of the channel as many as the number of slots of the selected value to occupy the channel when the channel is in the idle state. At this point, a range in which a random value is selected is defined by the contention window. Here, a size of the contention window may be defined as a fixed value or a variable value. When the size of the contention window is defined as the variable value, a reference to change the size of the contention window may be defined differently. The size of the contention window may vary by at least one of a lot of information such as information (for example, time or ratio at which a signal of a predetermined level or more is present, occupancy ratio, or the like) on an occupancy state of a channel to be used, the number of communication nodes using the same channel, receiving error information (for example, ACK/NACK), contention information, and detection information of other communication nodes that are examples of the reference to change the variable value.

The communication node may transmit a signal on the basis of a carrier sensing adaptive transmission (CSAT) procedure. That is, the communication node may transmit a signal on the basis of a preset duty cycle. The communication node may transmit a signal when the current duty cycle is a duty cycle that is allocated for the communication node supporting cellular communications. On the other hand, the communication node may not transmit a signal when the current duty cycle is a duty cycle that is allocated for the communication node supporting communications (e.g., WLAN, or the like) other than the cellular communications. The duty cycle may be adaptively determined on the basis of the number of communication nodes supporting the WLAN present in the unlicensed band, the use state of the unlicensed band, or the like.

The communication node may perform a discontinuous transmission in the unlicensed band. For example, when a maximum transmission duration or a maximum channel occupancy time (maximum COT) is set in the unlicensed band, the communication node may transmit a signal within the maximum transmission duration and may transmit the remaining signals within the next maximum transmission duration when not transmitting all signals within the current maximum transmission duration. Further, the communication node may select a carrier having a relatively smaller interference in the unlicensed band and may be operated in the selected carrier. Further, when transmitting a signal in the unlicensed band, the communication node may control transmit power to reduce an interference with other communication nodes.

Meanwhile, the communication node may support code division multiple access (CDMA)-based communication protocol, wideband CDMA (WCDMA)-based communication protocol, time division multiple access (TDMA)-based communication protocol, frequency division multiple access (FDMA)-based communication protocol, single carrier (SC)-FDMA-based communication protocol, orthogonal frequency division multiplexing (OFDM)-based communication protocol, orthogonal frequency division multiple access (OFDMA)-based communication protocol, or the like.

Figure 5:
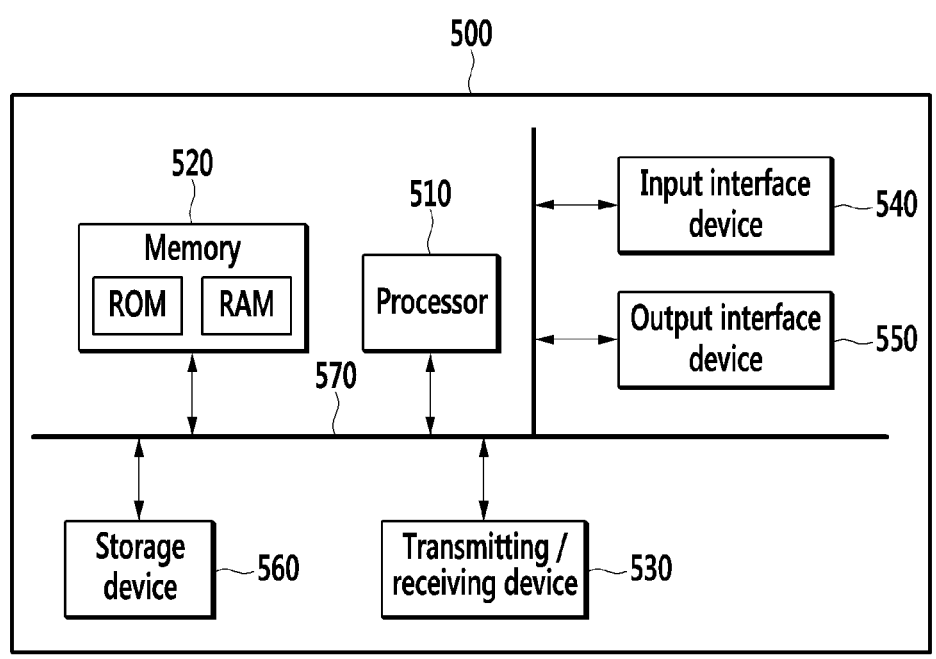
FIG. 5 is a diagram illustrating a communication node configuring the wireless communication network according to the exemplary embodiment of the present invention.

FIG. 5 is a diagram illustrating a communication node configuring the wireless communication network according to the exemplary embodiment of the present invention.

Referring to FIG. 5, a communication node 500 may include at least one processor 510, a memory 520, and a transmitting/receiving device 530 connected to a network to perform communications. Further, the communication node 500 may further include an input interface device 540, an output interface device 550, a storage device 560, or the like. Each of the components included in the communication node 500 may be connected to each other by a bus 570 to communicate with each other.

The processor 510 may run a program command that is stored in at least one of the memory 520 and the storage device 560. The processor 510 may mean a central processing unit (CPU), a graphics processing unit (GPU), or an exclusive processor that performs method according to exemplary embodiments of the present invention. The memory 520 and the storage device 560 may each be configured of at least one of a volatile storage medium and a non-volatile storage medium. For example, the memory 520 may be configured of at least one of a read only memory (ROM) and a random access memory (RAM).

Next, method for operating a communication node in a wireless communication network will be described. Even when a method (e.g., transmission or reception of a signal) performed at a first communication node among the communication nodes is described, a second communication node corresponding thereto may perform a method (e.g., reception or transmission of the signal) corresponding to the method performed at the first communication node. That is, when an operation of a terminal is described, a base station corresponding thereto may perform an operation corresponding to the operation of the terminal. On the contrary, when the operation of the base station is described, the terminal corresponding thereto may perform an operation corresponding to the operation of the base station.

Figure 6:
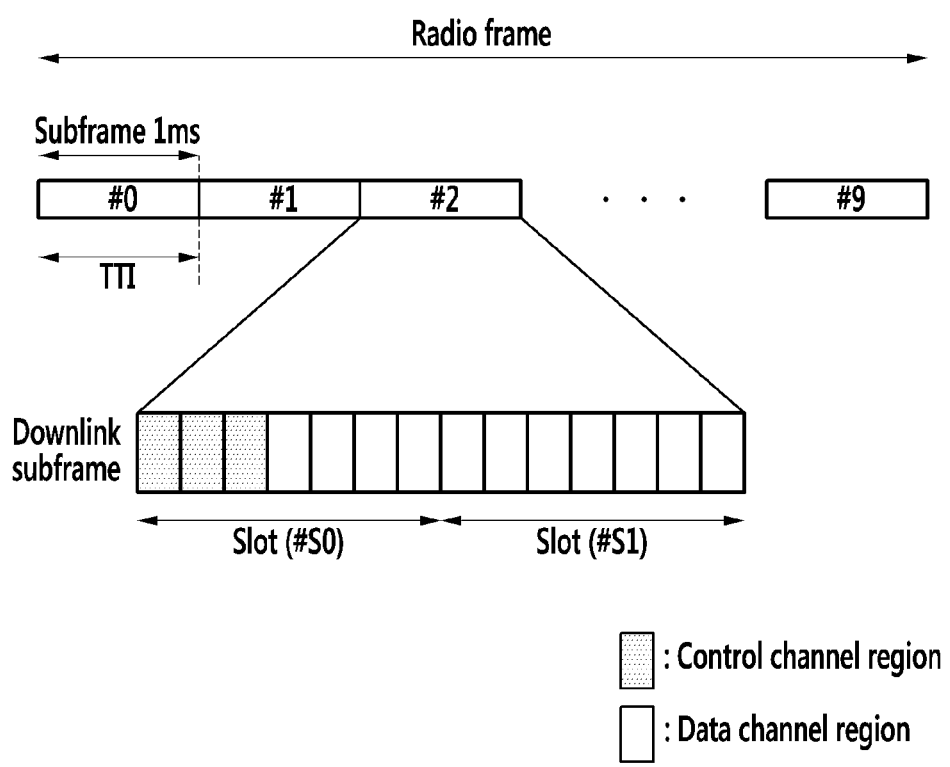
FIG. 6 is a diagram illustrating an example of a downlink subframe used in an LTE/LTE-A system.

FIG. 6 is a diagram illustrating an example of a downlink subframe used in an LTE/LTE-A system.

Referring to FIG. 6, in the LTE system that is a representative mobile communication system, one wireless frame includes 10 subframes #0 to #9 having a length of 1 ms in a time domain.

In the LTE system, a transmission time interval (TTI) is used as a minimum time unit in which data are transmitted and is set to be equal to a length of one subframe. That is, the TTI has a time length of 1 ms.

The subframes #0 to #9 each consist of two slots #S0 and #S1, in which each slot #S0 and #S1 has a length of 0.5 ms. The slots #S0 and #S1 include a plurality of symbols in a time domain and a plurality of resource blocks (RBs) in a frequency domain. One RB includes a plurality of subcarriers in the frequency domain. The symbol may be called an orthogonal frequency division multiplex (OFDM) symbol, an OFDMA symbol, an SC-FDMA symbol, or the like depending on a multiple access scheme. The number of symbols included in one slot may be variously changed depending on a channel bandwidth or a length of a cyclic prefix (CP). For example, in the case of a normal CP, one slot includes 7 symbols but in the case of an extended CP, one slot includes 6 symbols.

The downlink subframe may be divided into a control channel region and a data channel region in the time domain. The control channel region of the licensed band cell may be allocated a physical downlink control channel (PDCCH), a physical control format indicator channel (PCFICH), a physical hybrid automatic retransmit request indicator channel (PHICH), or the like. The data channel region includes a physical downlink shared channel (PDSCH) for transmitting downlink data. Some of the data channel region may be allocated an enhanced physical downlink control channel (EPDCCH). The PDCCH transmits resource allocation information of the PDSCH and resource allocation information of the PUSCH.

A first symbol in the subframe includes the PCFICH that transmits information about the number of symbols used for control channel transmission. Further, the control channel region may include the PHICH transmitting a hybrid automatic repeat reQuest (HARQ) acknowledgment/negative-acknowledgement (ACK/NACK) signal that is response information to an uplink transmission. The PDCCH and the EPDCCH transmit downlink control information (DCI) control information. The DCI may include resource allocation information or resource control information for a terminal and a The DCI may include group. For example, the DCI may include uplink scheduling information or downlink scheduling information, an uplink transmit power control command, or the like.

The DCI transmitted through the PDCCH or the EPDCCH has different formats depending on a kind and the number of information fields, the number of bits of each information field, or the like. DCI formats 0, 3, and 3A may be defined for the purpose of uplink and DCI formats 1, 1A, 1 B, 1C, 1 D, 2, 2A, 2B, 2C, or the like may be defined for the purpose of downlink. Each DCI format selectively includes information of a carrier indicator field (CIF), RB assignment, a modulation coding scheme (MCS), a redundancy version (RV), a new data indicator (NDI), a transmit power control (TPC), a HARQ process number, precoding matrix indicator (PMI) confirmation, a hopping flag, a flag field, or the like depending on a format. Therefore, a size of the control information suited for the DCI format may be altered. Further, for transmission of at least two kinds of control information, the same DCI format may be used. In this case, the control information is divided by a DCI format flag field. The following Table 1 summarizes the information included in each of the DCI formats.

TABLE 1

| DCI Format | Information |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustments |

The (E)PDCCH is transmitted on aggregation of one (enhanced) control channel element ((E)CCE) or a plurality of contiguous (E)CCEs. The (E)CCE is a logical allocation unit and consists of a plurality of resource element groups (REG). The number of bits transmitted to the (E)PDCCH is determined on the basis of a relationship between the number of (E)CCEs and a code rate provided by the (E)CCE.

The control information transmitted through the (E)PDCCH according to the DCI format is attached with a cyclic redundancy check (CRC) for error detection. The CRC is masked with a radio network temporary identifier depending on an object (terminal, or the like) receiving the (E)PDCCH or usage. More specifically, the control information transmitted through the (E)PDCCH is attached with the CRC scrambled with the RNTI.

A kind and corresponding values of RNTIs may be shown in the following Table 2.

TABLE 2

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |
| FFF4-FFFC | Reserved for future use |
| FFFD | M-RNTI |
| FFFE | P-RNTI |
| FFFF | SI-RNTI |

The usage for each RNTI is shown in the following Table 3.

TABLE 3

| RNTI | Usage |
| --- | --- |
| P-RNTI | Paging and System Information change notification |
| SI-RNTI | Broadcast of System Information |
| M-RNTI | MCCH Information Change notification |
| RA-RNTI | Random Access Response |
| eIMTA-RNTI | eIMTA TDD UL/DL Configuration Notification |
| Temporary C-RNTI | Contention Resolution (when no valid C-RNT is available) |
| Temporary C-RNTI | Msg3 transmission |
| C-RNTI | Dynamically scheduled unicast transmission (상향링크 또는 하향링크) |
| C-RNTI | Triggering of PDCCH ordered random access |
| Semi-Persistent Scheduling C-RNTI | Semi-Persistently scheduled unicast transmission(activation, reactivation and retransmission) |
| Semi-Persistent Scheduling C-RNTI | Semi-Persistently scheduled unicast transmission (deactivation) |
| TPC-PUCCH-RNTI | Physical layer uplink power control |
| TPC-PUSCH-RNTI | Physical layer uplink power control |
| SL-RNTI | Dynamically scheduled side link transmission |

An identifier associated with the unlicensed band cell may be defined as follows. Here, for convenience, the identifier associated with the unlicensed band cell is called an unlicensed cell-RNTI (U-RNTI). The U-RNTI may be differently called depending on the unlicensed band cell information. The unlicensed band cell means a cell configured through the unlicensed band.

The (E)PDCCH including the CRC scrambled with the U-RNTI may be transmitted to a PDCCH common search space or a UE-specific search space. A location of the (E)PDCCH actually transmitted in each search space may be determined by an (E)CCE index that is calculated by an aggregation level of a CCE and a U-RNTI value. The terminal may determine a candidate location $S_k^{(L)}$ of the CCEs monitoring the (E)PDCCH in the entire search space, on the basis of the following Equation 1.

$$S_k^{(L)} = L\{(Y_k + m') \bmod \lfloor N_{CCE,k}/L \rfloor\} \quad \text{(Equation 1)}$$

In the above Equation 1, $N_{CCE,k}$ represents the total number of CCEs of k subframe and L represents the aggregation level and may have a value of 1, 2, 4, or 8. The CCE aggregation level configuring the (E)PDCCH transmitted to a partial subframe of the unlicensed band cell may have a value of 16 or 32 larger than 8. m' represents a positive integer smaller than the total number $M^{(L)}-1$ of PDCCH candidates to be monitored in the given search space. $Y_k$ may have a value of 0 in the common search space. Yk may be a value determined by the RNTI value. In the case of the unlicensed band cell, $Y_k$ may be the U-RNTI value.

The U-RNTI value may be allocated to the UE-specific depending on the usage or may be designated as a common value (or reserved value) of the base station or the unlicensed band cell.

When the U-RNTI value is allocated to the UE-specific, the information on the U-RNTI value may be transmitted through RRC signaling newly adding/configuring the unlicensed band cell.

The unlicensed band cell may be operated by the CA with the licensed band cell. Configuration, add, modify, or release of the unlicensed band cell is performed by the RRC signaling. For example, the configuration, add, modify, or release of the unlicensed band cell may be performed through an RRC connection reconfiguration message. The RRC message may be transmitted from the licensed band cell to the terminal. The RRC message may include information required for the operation of the unlicensed band cell.

When the U-RNTI value is designated as the common value of the base station or the unlicensed band cell, the U-RNTI is used to transmit information on a configuration/system, or the like of the unlicensed band cells that may be configured in the base station. Like an SI-RNTI value, the U-RNTI value may be designated in advance or transmitted through the RRC signaling. Further, the U-RNTI may have different values in each unlicensed band cell and transmitted through the RRC signaling. The U-RNTI value may be included in the RRC message during a procedure of newly configuring the unlicensed band cell as a secondary cell (Scell).

The U-RNTI may be used as the usage for transmitting the control information of different unlicensed band cells.

The U-RNTI may be used for dynamic activation or deactivation of the unlicensed band cell. In connection with this, the U-RNTI value may be differently designated depending on the usage or the object that needs to receive the (E)PDCCH. That is, the U-RNTI for activation/deactivation of cell in common to all the terminals in the cell may be defined or the U-RNTI for activation/deactivation of cell specific to each terminal may be defined.

Figure 7:
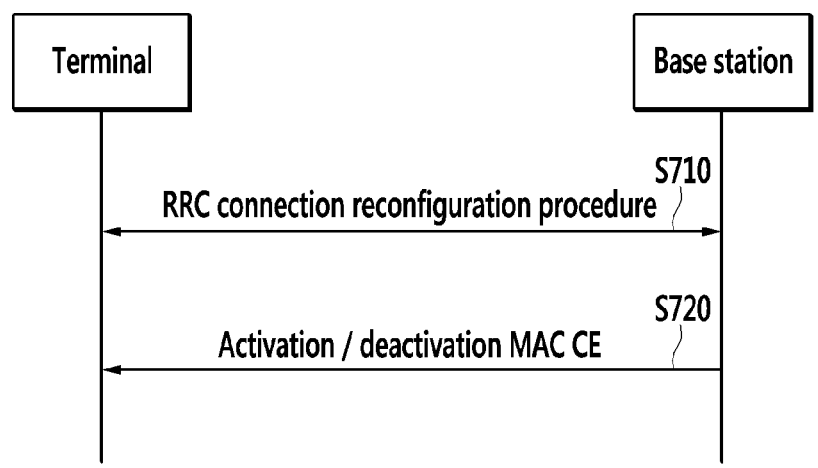
FIG. 7 is a diagram illustrating a method for activating or deactivating an unlicensed band cell according to an exemplary embodiment of the present invention.

FIG. 7 is a diagram illustrating a method for activating or deactivating an unlicensed band cell according to an exemplary embodiment of the present invention.

Referring to FIG. 7, the terminal may perform addition/release on the secondary cell (Scell) by an RRC connection reconfiguration procedure in addition to a primary cell (Pcell) connected to the base station by an RRC connection/configuration procedure at an early stage (S710).

The added unlicensed band Scell is in a deactivated state at first. Next, as the Scell is changed to an activated state, a data transmission may be made in the unlicensed band Scell.

The change of the licensed band Scell to the activated state may be made by activation/deactivation MAC control element (CE) signaling. For example, the state of the Scell may be changed to the activated state by setting an Scell index of the MAC CE to be 1 from 0. The change of the licensed band Scell from the activated state to the deactivated state may be made by changing the Scell index of the MAC CE to 0 again or may be made when a predetermined timer expired by a Scell deactivation time field value of a MAC-MainConfig message that is the RRC message. The Scell deactivation time may be set to be 20, 40, 80, 160, 320, 640, or 1280 ms. If the Scell deactivation time field is not defined in the MAC-MainConfig message, it may be assumed that the terminal sets a value of the corresponding timer to be infinity. The Scell deactivation time field value is identically applied to all the Scells. The terminal receiving the activation MAC CE at an n-th subframe starts (Scell activation) or restarts (Scell reactivation) an Scell deactivation timer from an n+8-th subframe of the corresponding cell. The terminal restarts the Scell deactivation timer every time it receives the (E)PDCCH for uplink or downlink resource scheduling (self-scheduling or cross-carrier scheduling) of a Scell activated later. The terminal receives the deactivation MAC CE at an n-th subframe or deactivates the corresponding cell before an n+8-th subframe when the Scell deactivation timer of the terminal expired.

The change of the activated state/deactivated state of the unlicensed band cell may be made by the activation/deactivation MAC CE like the licensed band Scell. That is, the base station transmits the activation/deactivation MAC CE to the terminal (S720), and thus may order the corresponding unlicensed band cell to be activated and deactivated. Further, when the Scell deactivation time timer applied to all the Scells expires, all the Scell may be changed to the deactivated state.

However, the terminal may not receive the (E)PDCCH up to the defined Scell deactivation time field value depending on a situation of other radio equipment of the same unlicensed band channel activated. In this case, when the timer expired, the activation procedure is required again. Therefore, the Scell deactivation time field value for the unlicensed band Scell may be determined by at least one of the following defined methods.

The unlicensed band Scell deactivation time field value may be defined as a minimum value of the unlicensed band Scell deactivation timer that is not present in the licensed band Scell. The Scell deactivation time field value may be defined as an integer multiple of the Scell deactivation time field value defined in the Mac-MainConfig message, defined through new RRC signaling for only the Scell of the unlicensed band, and defined as infinity for the unlicensed band Scell regardless of the Scell deactivation time field value.

When the minimum value of the unlicensed band Scell deactivation timer is defined, a fixed minimum value may be defined in advance or the minimum value may be transmitted to terminals through the RRC signaling. The terminal may determine the larger value of the previously defined minimum value or the minimum value of the signaled Scell deactivation timer and the Scell deactivation time field value of the MAC-MainConfig message as the start time of the unlicensed band Scell deactivation timer.

When the unlicensed band Scell deactivation time field value is defined as the integer multiple of the Scell deactivation time field value defined in the MAC-MainConfig message, the corresponding integer value may be defined as the fixed value in advance or may be transmitted to the terminals through the RRC signaling. The terminal may set the start time of the unlicensed band Scell deactivation timer as the integer multiple value of the Scell deactivation time field value defined in the MAC-MainConfig message.

When the unlicensed band Scell deactivation time field value is defined through new RRC signaling for the unlicensed band cell, an initial value of the unlicensed band Scell deactivation timer in the licensed band cell or the unlicensed band cell may be transmitted to the terminals through the RRC signals.

When the unlicensed band Scell deactivation time field value is defined as the infinity, the terminal may deactivate the unlicensed band Scell depending on the deactivation MAC CE transmitted in the licensed band cell or the unlicensed band cell.

Figure 8:
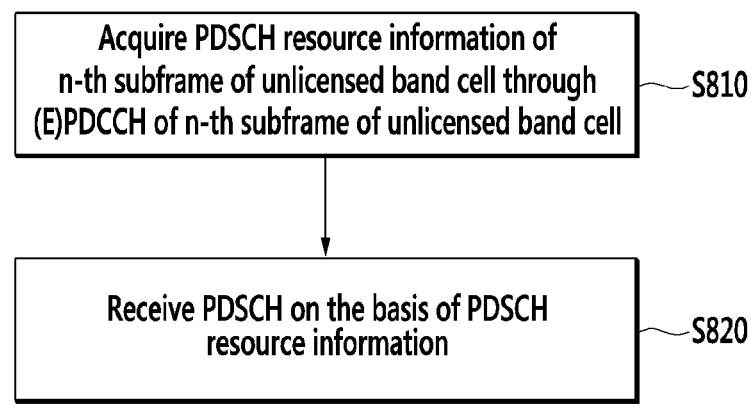
FIG. 8 is a diagram illustrating a downlink scheduling method of an unlicensed band cell according to an exemplary embodiment of the present invention.

Meanwhile, unlike the existing licensed band, the activation/deactivation change of the unlicensed band cell may be made by the (E)PDCCH, not the MAC CE FIG. 8 is a diagram illustrating a downlink scheduling method of an unlicensed band cell according to an exemplary embodiment of the present invention.

Referring to FIG. 8, the downlink scheduling of the unlicensed band cell may be performed by the following defined method.

PDSCH resource information of the n-th subframe of the unlicensed band cell may be transmitted through the (E)PDCCH of the n-th subframe of the same unlicensed band cell. The terminal may acquire the PDSCH resource information of the n-th subframe of the unlicensed band cell through the (E)PDCCH of the n-th subframe of the unlicensed band cell (S810).

The terminal may receive the PDSCH of the n-th subframe of the unlicensed band cell on the basis of the PDSCH resource information (S820).

As another method, the PDSCH resource information configured at the n-th subframe of the unlicensed band cell may be transmitted by a cross-carrier scheduling method in the (E)PDCCH of the n-th subframe of the licensed band cell.

In connection with the uplink scheduling, the (E)PDCCH configured at the n-th subframe of the licensed band cell or the unlicensed band cell may transmit PUSCH grant related DCI 0 of an n+4-th uplink subframe. If the scheduled (n+4)-th subframe is occupied by another WLAN or a communication node of another unlicensed band cell, the terminal may be operated by one of the following methods. Here, another unlicensed band cell means an unlicensed band cell of another communication operator.

According to a first method, if the n+4-th subframe scheduled at the n-th subframe is occupied by another signal, the terminal abandons the uplink transmission and waits to receive (E)PDCCH including new DCI 0.

According to a second method, the terminal may distinguish a channel state from the n+4-th subframe to a (n+4+$N_{UL\_Window}$)-th subframe to transmit the uplink when the corresponding channel is in an idle state. In this case, for m larger than 0 but smaller than $N_{UL\_Window}$, uplink information of a (n+4+m)-th subframe may use the information of the DCI 0 of the (E)PDCCH transmitted at the n-th subframe. The $N_{UL\_Window}$ value may be transmitted to the terminal through the RRC signaling, for example, the RRC connection reconfiguration message or another RRC message or a new unlicensed band management RRC message. The $N_{UL\_Window}$ value is a positive integer value including 0. For example, if the $N_{UL\_Window}$ value is 0 and the n+4-th subframe is occupied by another WLAN or a communication node of another LTE unlicensed band cell, the terminal abandons the uplink transmission at the n+4-th subframe and waits to receive (E)PDCCH including new DCI 0

That is, the second method may include the first method.

When the $N_{UL\_Window}$ may not transmit the $N_{UL\_Window}$ through the RRC signaling, the $N_{UL\_Window}$ value may be determined as an maximum integer value that does not exceed the maximum transmission duration or the maximum channel occupancy time for the unlicensed band cell or may be defined in advance.

Figure 9:
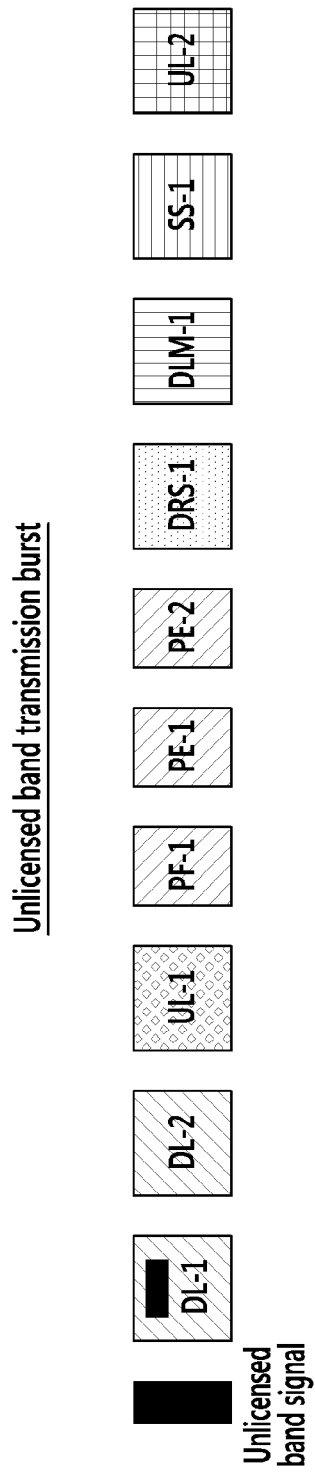
FIG. 9 is a diagram illustrating an example of an unlicensed band transmission burst according to an exemplary embodiment of the present invention.

FIG. 9 is a diagram illustrating an example of an unlicensed band transmission burst according to an exemplary embodiment of the present invention.

Referring to FIG. 9, unlike the licensed band cell, the unlicensed band cell limits the time when the continuous transmission may be made based on the maximum transmission time technical regulations If the terminal should observe the technical regulations that assess the occupancy state of the channel and then perform the transmission, the terminal cannot transmit data until a transmission of another communication node ends. Therefore, the transmission of the unlicensed band cell has aperiodic, discontinuous, opportunistic features. According to the exemplary embodiment of the present invention, the continuous transmission by the base station or the terminal in the unlicensed band cell for a predetermined time according to the features of the unlicensed band cell is defined as the unlicensed band transmission burst.

The communication node assesses the occupancy state of the unlicensed band cell and configures the unlicensed band transmission burst. As described above, the communication node may be the base station or the terminal. The unlicensed band transmission burst at least consists of an aggregation of unlicensed band subframes and may include an unlicensed band signal.

The unlicensed band signal may be present at a start part of the unlicensed band transmission burst. The unlicensed band signal may be configured to achieve at least one of channel occupancy, an automatic gain control (AGC), time and frequency synchronization, a cell identifier, and a length of unlicensed band transmission burst.

The unlicensed band subframe may be a normal subframe in the licensed band or one of the subframe structures defined in the unlicensed band. The normal subframe in the licensed band may consist of one of subframes DL-1, DL-2, and UL-1.

The subframe DL-1 represents a downlink subframe in which a synchronization signal of a primary synchronization signal (PSS) or a secondary synchronization signal (SSS) is included.

The subframe DL-2 represents a downlink subframe in which the synchronization signal of the PSS or the SSS is not included.

The subframe UL-1 represents an uplink subframe in which the physical uplink control channel (PUCCH) and the PUSCH are included.

The downlink subframes like the subframes DL-1 and DL-2, or the like may include a cell-specific reference signal (CRS). The CRS is a reference signal transmitted to all terminals within a cell and is used for channel estimation.

The subframe defined in the unlicensed band may consist of one of subframes PF-1, PE-1, PE-2, DRS-1, DLM-1, SSL-1, UL-2.

The subframes PF-1, PE-1, and PE-2 represent a downlink subframe having TTI shorter than TTI of 1 ms. Hereinafter, the downlink subframes PF-1, PE-1, and PE-2 having the TTI shorter than the TTI of 1 ms are referred to as a partial subframe.

The partial subframe PF-1 represents a downlink subframe in which the first any N symbols of the TTI are not transmitted and the subframe structure transmitted may consist of a symbol length of a downlink pilot time slot (DwPTS) structure in a special subframe of frame type 2. The special subframe consists of a downlink period of the DwPTS and an uplink period of an uplink pilot time slot (UpPTS) in the TTI of 1 ms Further, a guard period for a round trip delay of a signal is included between the DwPTS and the UpPTS.

The partial subframe PE-1 represents a downlink subframe in which the last any M symbols of the TTI are not transmitted and the subframe structure transmitted may consist of the DwPTS in the special subframe of the frame type 2. In this case, the DwPTS structure consisting of three symbols in the DwPTS structure may be ruled out.

The partial subframe PE-2 represents the downlink subframe in which the signal is not transmitted for a predetermined time, in the last symbol of the TTI A predetermined time in which a signal is not present may be one of 16 μs, 25 μs, and 34 μs. The predetermined time in which the signal is not present may include a backoff time is provided through signaling by the base station. Further, the last symbol may consist of Postfix of a preceding symbol.

A subframe DRS-1 represents a downlink subframe in which the unlicensed band discovery reference signal (DRS) and the PDSCH are multiplexed. Here, unlike the DRS of Release 12, the unlicensed band DRS may be a DRS consisting of a reference signal of a new pattern, that is, the CRS and the PSS/SSS to be suitable for the unlicensed band cell environment. The terminal connected to the cell may know the time or the period [DRS measurement timing configuration (DMTC) period] information when the DRS is transmitted. Therefore, the terminal may perform signal processing on the downlink subframe including the unlicensed band DRS with rate matching different from rate matching of the normal subframe of the existing licensed band.

The subframe DLM-1 has the same structure as a multicast broadcast signal frequency network (MBSFN) subframe and represents a downlink subframe in which the first one or two symbols in the TTI include the CRS and the remaining symbols do not include the CRS. The PDSCH of the period in which the CRS is not included may consist of a transmission mode using DMRS. This is to minimize an overhead due to the CRS configuration.

In this case, a downlink subframe like the subframes PF-1, PE-1, PE-2, DRS-1, DLM-1, or the like may include the CRS.

The subframe SSL-1 represents a subframe in which a downlink symbol and an uplink symbol are simultaneously configured. An interval between the downlink and the uplink may be a fixed time. For example, the fixed time may be set to be one of 16 μs, 25 μs, and 34 μs. The interval between the downlink and the uplink may include the backoff time is provided through signaling by the base station.

The uplink signal may consist of at least one of a sounding reference signal (SRS) and a physical random access channel (PRACH).

The subframe UL-2 represents an uplink subframe consisting of only the PUCCH. When the subframe consists of only the PUCCH, the subframe has a nature of the control signal rather than the data transmission and therefore may be transmitted after the fixed time interval without the channel occupancy assessment (LBT) after the downlink. For example, the fixed time may be set to be one of 16 µs, 25 µs, and 34 µs.

Figure 10:
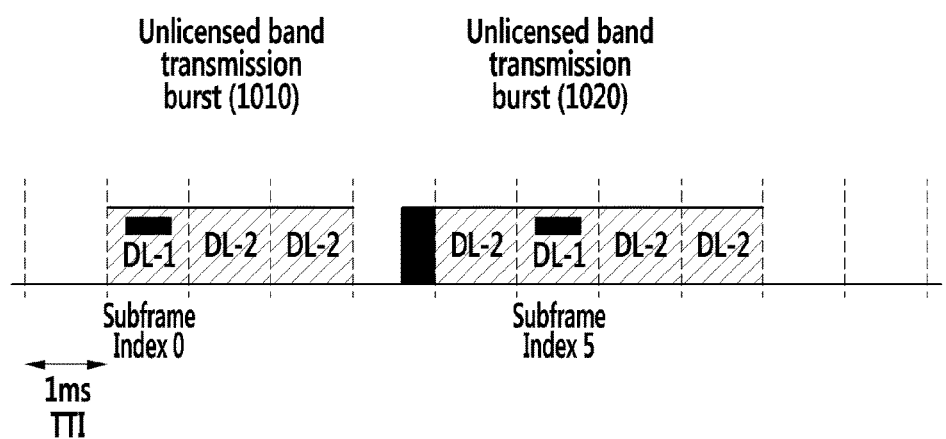
FIGS. 10 and 11 each are diagrams illustrating an example of the unlicensed band transmission burst including only a downlink subframe according to the exemplary embodiment of the present invention.
Figure 11:
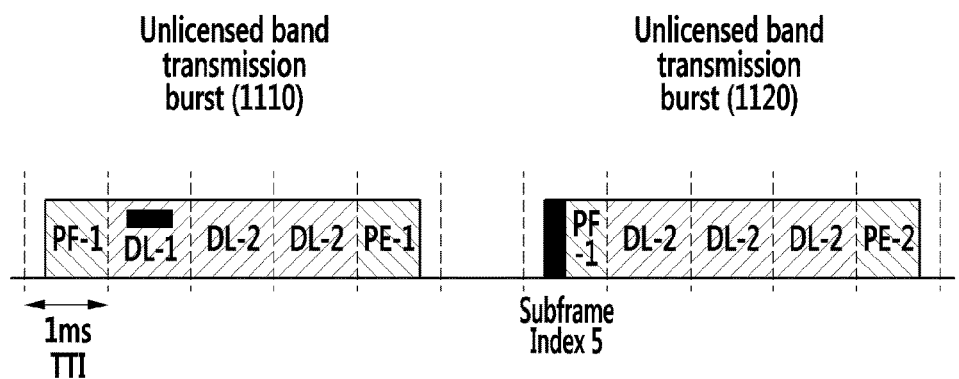

FIGS. 10 and 11 each are diagrams illustrating an example of the unlicensed band transmission burst including only a downlink subframe according to the exemplary embodiment of the present invention.

Referring to FIGS. 10 and 11, unlicensed band transmission bursts 1010, 1020, 1110, and 1120 may consist of only a downlink subframe.

Referring to FIG. 10, the unlicensed band transmission bursts 1010 and 1020 may consist of a combination of the subframes DL-1 and DL-2.

One frame consists of ten subframes and the ten subframes have sequentially subframe indexes from 0 to 9. In this case, the unlicensed band transmission burst 1010 may consist of three subframes of which the subframe indexes are 0, 1, and 2 and the unlicensed band transmission burst 1020 may consist of four subframes of which the subframe indexes are 4, 5, 6, and 7. The subframe DL-1 in the unlicensed band transmission bursts 1010 and 1020 may be configured in the subframe index 0 and the subframe index 5. In this case, the unlicensed band signal may not be included in the unlicensed band transmission burst 1010 like the unlicensed band transmission burst 1010 and may be included in the unlicensed band transmission burst 1020 like the unlicensed band transmission burst 1020.

Referring to FIG. 11, the unlicensed band transmission burst 1110 may consist of a combination of the subframes DL-1, DL-2, and PF-1. The subframe DL-1 may be configured in the subframe index 0. Further, the subframe PE-1 may be configured at a location of the last subframe of the unlicensed band transmission burst 1110.

Further, the unlicensed band transmission burst 1120 may also consist of a combination of the subframes DL-2, PF-1, and PE-2. That is, the unlicensed band transmission burst 1120 may not include the PSS/SSS. The subframe PF-1 may be configured at a location of the first subframe of the unlicensed band transmission burst 1120 and the subframe PE-1 may be configured at a location of the last subframe of the unlicensed band transmission burst 1120.

The unlicensed band signal may not be transmitted like the unlicensed band transmission burst 1110 and may be transmitted at some of first any N symbols of the subframe PF-1 like the unlicensed band transmission burst 1120.

As such, the PSS/SSS may be included in the subframe indexes 0 and 5 within one frame. Here, the number of symbols of the PSS/SSS or the number of ports of the CRS may be set to be more than or equal to the number of symbols of the PSS/SSS or the number of CRS ports of the DRS of the Release 12. For example, the number of CRS ports of the subframe indexes 0 and 5 may be equal to or more than the number of CRS ports of the unlicensed band DRS.

Figure 12:
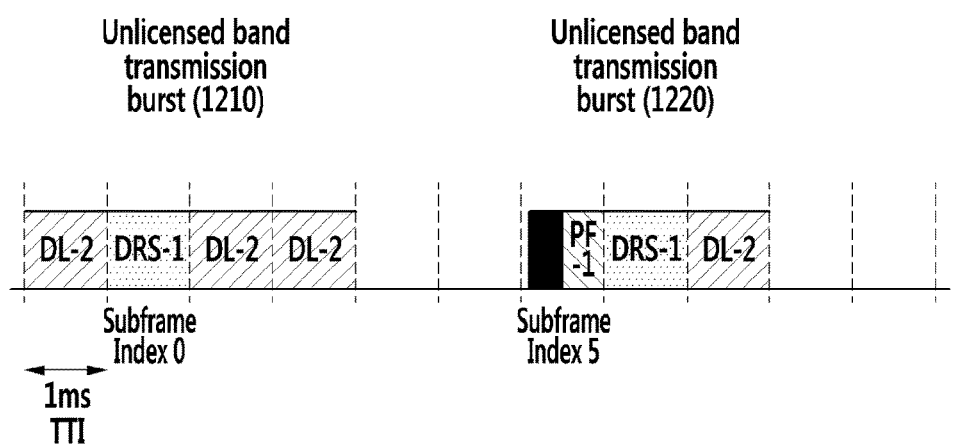
FIG. 12 is a diagram illustrating an example of the unlicensed band transmission burst including a subframe in which unlicensed band DRS and PDSCH are multiplexed, according to the exemplary embodiment of the present invention.

FIG. 12 is a diagram illustrating an example of the unlicensed band transmission burst including a subframe in which unlicensed band DRS and PDSCH are multiplexed, according to the exemplary embodiment of the present invention.

Referring to FIG. 12, the unlicensed band transmission bursts 1210 and 1220 may consist of a combination of the subframes DRS-1, DL-2, and PF-1

In the unlicensed band transmission burst 1210, the subframe DRS-1 may be configured in the subframe index 0 within one frame and the subframe DL-2 may be configured just before the subframe DRS-1. Further, the subframe DL-2 may be configured in the subframe indexes 1 and 2.

The unlicensed band transmission burst 1220 may configure of three subframes of which the subframe indexes are 5, 6, and 7. The subframe DRS-1 needs to be transmitted to the subframe index 5 according to the DMTC period and the subframe DRS-1 may be configured in the subframe index 6 according to the performance of the LBT. The subframe PF-1 may be configured in the subframe index 5 and the subframe DL-2 may be configured in the subframe index 7.

The unlicensed band signal may be transmitted at the first any N symbols of the subframe PF-1 of the unlicensed band transmission burst 1220.

As such, when the unlicensed band DRS and the PDSCH are multiplexed, the unlicensed band DRS consists of a subset of the PSS/SSS/CRS of the Release 12, and therefore the rate matching of the PDSCH may be different depending on the method for configuring a subset. The terminal may predict whether the unlicensed band DRS and the PDSCH are multiplexed on the basis of the DMTC information. Alternatively, the terminal may predict whether the unlicensed band DRS and the PDSCH are multiplexed on the basis of the signaling.

Figure 13:
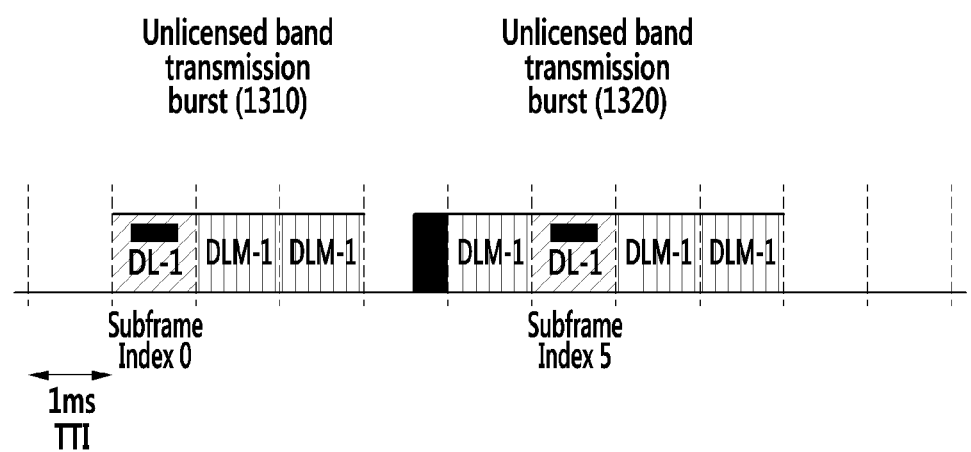
FIG. 13 is a diagram illustrating an example of the unlicensed band transmission burst including a subframe consisting of a symbol in which CRS is included and a symbol in which the CRS is not included, according to the exemplary embodiment of the present invention.

FIG. 13 is a diagram illustrating another example of the unlicensed band transmission burst and is a diagram illustrating a structure including a subframe consisting of a symbol in which CRS is included and a symbol in which the CRS is not included, according to the exemplary embodiment of the present invention.

Referring to FIG. 13, the unlicensed band transmission bursts 1310 and 1320 may consist of a combination of the subframes DL-1 and DLM-1. The unlicensed band transmission burst 1310 may consist of three subframes of which the subframe indexes are 0, 1, and 2 and the unlicensed band transmission burst 1320 may consist of four subframes of which the subframe indexes are 4, 5, 6, and 7. The subframe DL-1 in the unlicensed band transmission bursts 1310 and 1320 may be configured in the subframe index 0 and the subframe index 5. In the unlicensed band transmission burst 1310, the subframe DLM-1 may be configured in the subframe indexes 0 and 1 and in the unlicensed band transmission burst 1320, the subframe DLM-1 may be configured in the subframe indexes 4, 6, and 7. The CRS may be included in the first one or two symbol periods of the subframe DLM-1.

Further, the unlicensed band signal may not be included in the unlicensed band transmission burst 1310 like the unlicensed band transmission burst 1310 and may be located at a start part of the unlicensed band transmission burst 1320 like the unlicensed band transmission burst 1320.

Figure 14:
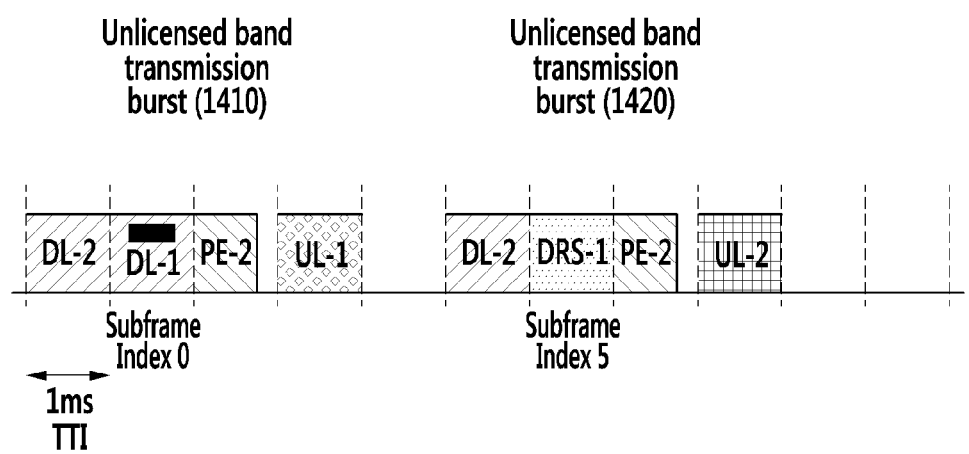
FIGS. 14 and 15 each are diagrams illustrating an example of the unlicensed band transmission burst consisting of the downlink subframe and an uplink subframe according to the exemplary embodiment of the present invention.
Figure 15:
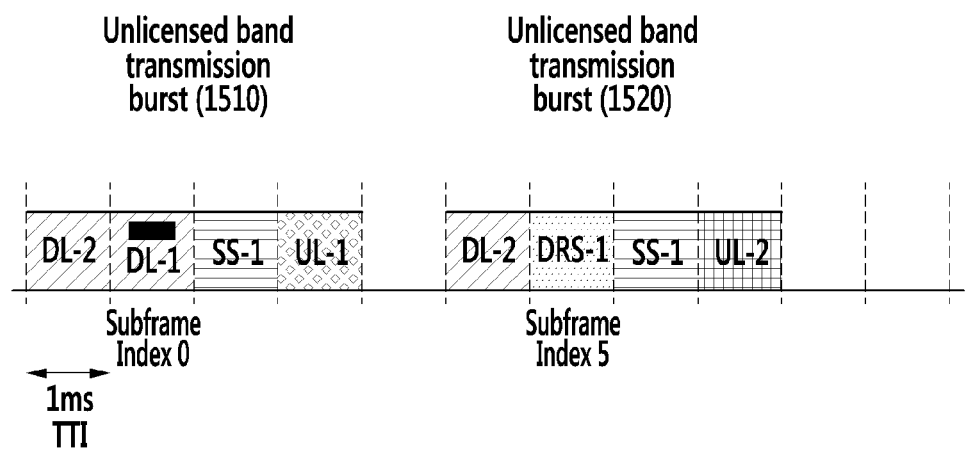

FIGS. 14 and 15 each are diagrams illustrating an example of the unlicensed band transmission burst consisting of a downlink subframe and an uplink subframe according to the exemplary embodiment of the present invention.

Referring to FIG. 14, an unlicensed band transmission burst 1410 may consist of a combination of the downlink subframes DL-1, DL-2, and PE-2 and the uplink subframe UL-1. Further, an unlicensed band transmission burst 1420 may consist of a combination of the downlink subframes DL-2, DRS-1, and PE-2 and the uplink subframe UL-2.

In the unlicensed band transmission burst 1410, the subframe DL-1 may be configured in the subframe index 0, the subframe PE-2 may be configured in the subframe index 1, the subframe UL-1 may be configured after the subframe PE-2. A period in which a signal is not transmitted for a predetermined time in the last symbol of the subframe PE-2 may be used as a switching time between the downlink and the uplink. Further, the subframe DL-2 may be configured just before the subframe DL-1.

In the unlicensed band transmission burst 1420, the subframe DRS-1 may be configured in the subframe index 5, the subframe PE-2 may be configured in the subframe index 6, the subframe UL-2 may be configured after the subframe PE-2. Further, the subframe DL-2 may be configured in the subframe index 4 just before the subframe DL-1.

Referring to FIG. 15, unlike the unlicensed band transmission burst 1410 illustrated in FIG. 14, in an unlicensed band transmission burst 1510, a special subframe SS-1 may be configured between the subframe DL-1 and the uplink subframe UL-1. Unlike the unlicensed band transmission burst 1410 illustrated in FIG. 14, in an unlicensed band transmission burst 1520, the special subframe SS-1 may be configured between the subframe DRS-1 and the subframe UL-2.

Meanwhile, in the downlink subframe configuration, the LTE system has the subframe index of the Pcell and the subframe index of the Scell identically configured. Therefore, in the CA configuration of the Pcell and the Scell of frame type 1, the PSS and the SSS are also transmitted to the Scell at timing of the subframe indexes 0 and 5 of the Pcell. The reason is that the Scell assigned to a specific terminal may configured as the Pcell to other terminals.

The terminal checks a cell ID using the PSS and the SSS of the Pcell or performs synchronization, or the like. However, the unlicensed band cell is not configured of the Pcell. Therefore, the PSS and the SSS may not be transmitted to the subframe indexes 0 and 5 of the frame type 1. Further, a physical broadcasting channel (PBCH) may not also be included in the unlicensed band transmission burst. When the unlicensed band transmission burst consists of four subframes of which the subframe indexes are 1, 2, 3, and 4, the unlicensed band transmission burst may not include the PSS and the SSS. As a result, to check the cell ID and perform the synchronization in the unlicensed band cell, a method other than the PSS/SSS needs to be used. For example, the cell ID may be checked by the licensed band signal or the CRS.

Figure 16:
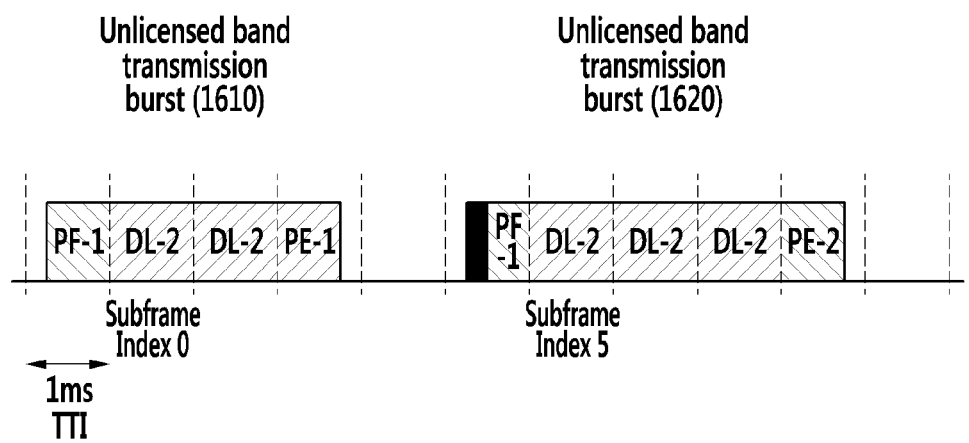
FIG. 16 is a diagram illustrating an example of the unlicensed band transmission burst not including PSS/SSS, according to the exemplary embodiment of the present invention.

FIG. 16 is a diagram illustrating an example of the unlicensed band transmission burst not including PSS/SSS, according to the exemplary embodiment of the present invention.

Referring to FIG. 16, an unlicensed band transmission burst 1610 may consist of a combination of the subframe DL-2, PF-1, and PE-1 and an unlicensed band transmission burst 1620 may consist of a combination of the subframe DL-2, PF-1, and PE-2. That is, the PSS/SSS may not be transmitted at the subframe indexes 0 and 5.

In the unlicensed band transmission burst 1610, the subframe DL-2 may be configured in the subframe index 0 and the subframe PE-1 may be configured at a location of the last subframe. Further, the subframe PF-1 may be configured at a location before the subframe index 0.

In the unlicensed band transmission burst 1620, the subframe DL-2 may be configured in the subframe index 5, the subframe PF-1 may be configured before the subframe DL-2, and the subframe PE-2 may be configured at the location of the last subframe.

The unlicensed band signal may be transmitted or may not be transmitted in first any N symbols of the subframe PF-1.

Meanwhile, when the unlicensed band transmission burst always requires the PSS/SSS, the PSS/SSS/CRS may be transmitted at the subframes of the subframe indexes 0 and 5. In the case of the unlicensed band cell, the subframe DL-1 including the PSS/SSS may also be transmitted at the subframe indexes other than the subframe indexes 0 and 5. Moe specifically, in the case of the unlicensed band cell, the subframe DL-1 may be transmitted at the subframe indexes other than the subframe indexes 0 and 5 among the subframes of the unlicensed band transmission burst. For example, when the unlicensed band transmission burst consists of four subframes of which the subframe indexes are 1, 2, 3, and 4, the subframe DL-1 including the PSS/SSS needs to be included in at least one subframe in the corresponding unlicensed band transmission burst. The subframe DL-1 may be located at the first subframe of the unlicensed band transmission burst. In this case, the terminal waking up from the discontinuous reception (DRX) may not recognize whether the corresponding subframe is the subframe DL-1 or the subframe DL-2. Therefore, there is a need to provide signaling a kind of the respective subframes to the terminal.

Figure 17:
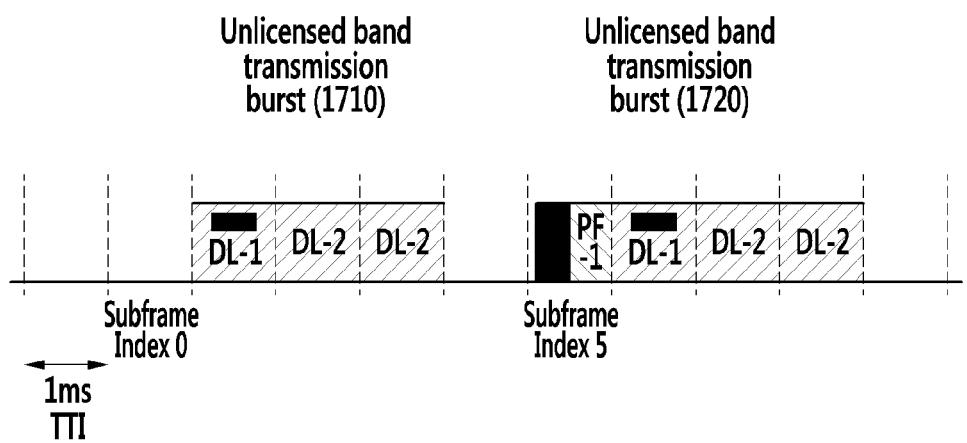
FIG. 17 is a diagram illustrating another example of the unlicensed band transmission burst according to the exemplary embodiment of the present invention and is a diagram illustrating an example in which the subframe including the PSS/SSS is transmitted at subframe indexes 0 and 5 and other subframe indexes.

FIG. 17 is a diagram illustrating another example of the unlicensed band transmission burst according to the exemplary embodiment of the present invention and is a diagram illustrating an example in which the subframe including the PSS/SSS is transmitted at subframe indexes 0 and 5 and other subframe indexes.

Referring to FIG. 17, the subframe DL-1 may be configured in the subframe index 1 of an unlicensed band transmission burst 1710. Further, the subframe DL-1 may be configured in the subframe index 6 of an unlicensed band transmission burst 1720. Unlike this, the subframe DL-1 including the PSS/SSS may be configured in any subframe index among the subframe indexes 1, 2, 3, 4, 6, 7, 8 and 9.

Next, a method for differentiating various subframe types that configure the unlicensed band transmission burs and a method for checking whether each subframe is subframe transmitted from a serving cell that the terminal wants will be described. The subframes configuring the unlicensed band transmission burst described above may be checked by the terminal without using the signaling. However, the terminal waking up from the DRX needs to check whether each subframe is the subframe transmitted from the serving cell. Further, when the unlicensed band transmission burst consists of the partial subframe, a method for checking it and signaling notifying a symbol length of the corresponding subframe may be required.

The signaling that may be included in all the subframes or each unlicensed band transmission burst may be used for the following purpose.

The number of symbols including the CRS configured in the subframe may be signaled. For example, the number of 1, 2, 4, or 6 symbols may be signaled to the terminal. The number of 1 or 2 or 4 or 6 symbols may be signaled to the terminal.

The information on the last subframe may be signaled. Whether the corresponding subframe is the last subframe may be signaled to the terminal. Whether the corresponding subframe as the last subframe is the normal subframe having the TTI of 1 ms or the partial subframe may be signaled to the terminal. How many symbols the corresponding subframe as the last subframe includes in the partial subframe structure may be signaled to the terminal.

The information on the number of subframes of the unlicensed band transmission burst may be signaled. In connection with the signaling for the number of subframes of the unlicensed band transmission burst, the remaining number of subframes of the burst current transmitted may be signaled to the terminal.

In connection with the signaling for the number of subframes of the unlicensed band transmission burst, the remaining number of subframes including current subframes of the burst current transmitted may be signaled to the terminal. In connection with the signaling for the number of subframes of the unlicensed band transmission burst, the number of subframes the subsequent unlicensed band transmission burst to be transmitted after the burst current transmitted may be signaled to the terminal.

After the unlicensed band transmission burst currently transmitted ends, the number of subframes that the terminal need not to perform the (E)PDCCH monitoring on may be signaled to the terminal.

Whether the subframe currently transmitted includes at least one of the channel state information-reference signal (CSI-RS) and the channel state information-interference measurement (CSI-IM) may be signaled to the terminal.

The transmit power for at least one signal of the CRS and the CSI-RS of the unlicensed band transmission burst may be signaled to the terminal.

As the signaling used for the foregoing purposes, there may be a method for using PHICH, a method for using U-RNTI, and a method for using DCI information. Here, the unlicensed band signaling using the PHICH structure defined for the existing uplink HARQ feedback may be used for the foregoing purposes. The method for using U-RNTI may be applied to scarmble the CRC of the PDCCH transmitted to the cell common search space or the (E)PDCCH transmitted to the UE specific search space. The method for using U-RNTI may be signaling transmitted, being included in the DCI of the PDCCH transmitted to the cell common search region or the (E)PDCCH transmitted to the UE-specific search space The signaling is generated by the base station and may be transmitted to the terminal.

An unlicensed band signaling method using the PHICH will be described.

The channel may be opportunistically occupied in the unlicensed band cell, and therefore the HARQ response information may not be transmitted at the fixed time corresponding to the uplink subframe index. Therefore, unlike the licensed band cell, the response information to the uplink may be asynchronously transmitted in the unlicensed band cell. In the uplink HARQ of the unlicensed band cell, the PHICH of the downlink PDCCH is not used, but a redundancy version and HARQ process information may be included in the DCI control information transmitted to the (E)PDCCH. In this case, the PHICH may be used for other information transmission. The exemplary embodiment of the present invention suggests a method for acquiring, by a terminal, information on various types of subframe structures using PHICH. Further, a method for acquiring cell IDs of each subframe by detecting at least one of designated sequences of PHICH is suggested.

The PHICH resource may be defined as an orthogonal sequence index ($n_{PHICH}^{seq}$) within a PHICH group ($n_{PHICH\text{-}group}$) and a PHICH group ($n_{PHICH}^{group}$). The number of PHICH groups ($n_{PHICH}^{group}$) is defined like the following Equation 2 to be changed depending on the CP or in the unlicensed band cell, the number of PHICH groups ($n_{PHICH}^{group}$) is designated at an upper layer and thus may be transmitted through the radio resource control (RRC) signaling.

$$n_{PHICH}^{group} = \begin{cases} \lceil N_g(N_{RB}^{DL}/8) \rceil, & \text{for normal cyclic prefix} \\ 2 \cdot \lceil N_g(N_{RB}^{DL}/8) \rceil, & \text{for extended cyclic prefix} \end{cases} \quad \text{(Equation 2)}$$

In the above Equation 2, $N_g \in \{1/6, 1/2, 1, 2\}$ may be possible and $N_g$ may be defined at the upper layer. $N_g$ is a value of $8/N_{RB}^{DL}$ and may be defined as a value of 1 or 2 in the unlicensed band cell. $N_g$ The PHICH sequence may have values from 0 to 7 and an orthogonal sequence [w(0) ... w($n_{SF}^{PHICH}$)] used for each PHICH sequence may be defined as shown in the following Table 4 depending on the CP.

TABLE 4

| Sequence | Orthogonal Sequence | |
|---|---|---|
| Index | Normal CP | Extended CP |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Information 0 or 1 transmitted to the PHICH becomes $b_0, b_1, \ldots, b_{M_{bit}}$ depending on the channel coding and is again modulated into PSK, such that it becomes complex symbols of Z(0), Z(1), ..., Z($M_s$−1). In this case, $M_{bit}=M_S$. Each of the complex symbols becomes a new symbol sequence d 0, ..., d($M_{symb}$−1) depending on the following Equation 3.

$$d_{(i)}=w(i \bmod N_{SF}^{PHICH}) \cdot (1-2c(i)) \cdot z(\lfloor i/N_{SF}^{PHICH} \rfloor)$$

$$d_{(i)}=w(i \bmod N_{SF}^{PHICH}) \cdot (1-2c(i)) \cdot z(\lfloor i/N_{SF}^{PHICH} \rfloor) \quad \text{(Equation 3)}$$

In the above Equation 3, i=0, ..., $M_{symb}$−1 and $M_{symb}=n_{SF}^{PHICH} \cdot M_S$. c(i) is a cell specific scrambling sequence and a generation initial value is determined by the following Equation 4.

$$c_{init}=(\lfloor n_s/2 \rfloor+1) \cdot (2N_{ID}^{cell}+1) \cdot 2^9 + N_{ID}^{cell}$$

$$c_{init}=(\lfloor n_s/2 \rfloor+1) \cdot (2N_{ID}^{cell}+1) \cdot 2^9 + N_{ID}^{cell} \quad \text{(Equation 4)}$$

Therefore, to accurately confirm the symbol transmitted to the PHICH, $N_{ID}^{cell}$ that is the cell ID is required. In other words, when the cell ID is changed, the defined PHICH information (HI) bit information is not acquired.

To check whether each subframe is transmitted from the serving cell, at least one PHICH sequence may be defined in at least one PHICH group to acquire the serving cell information. For example, when the normal CP is used in a bandwidth of 20 MHz and the PHICH group is configured in three depending on the information defined from the upper layer, HI bit 0 of PHICH sequence 0 and HI 1 of PHICH sequence 1 of PHICH group 1 may be the information of the corresponding cell. The terminal may check whether a value of the corresponding PHICH sequence of the corresponding PHICH group is equal to the corresponding HI bit to acquire the cell information. Here, $b_0, b_1, \ldots, b_{M_{bit}}$ may be differently defined for each cell.

That is, the cell acquisition information may consist of at least one combination of (at least one PHICH group, at least one set of PHICH sequences, HI bit, $b_0, b_1, \ldots, b_{M_{bit}}$ bit). The combination information may be signaled to the terminal in association with the unlicensed band cell configuration information. For example, the combination information may be included in the RRC connection reconfiguration message or may be transmitted, being defined in the system information block (SIB) for the unlicensed band cell.

Further, the information on the types of each subframe may consist of at least one combination of (at least one PHICH group, at least one set of PHICH sequences, HI bit, $b_0, b_1, \ldots, b_{M_{bit}}$ bit) by a similar method. For example, if a value of PHICH sequence 2 of the PHICH group 1 is 1, the corresponding subframe may be defined as the subframe DLM-1. Further, when the number of information bits for all the possible combinations is x, the types of each subframe may be designated as x PHICH sequences.

At least one combination information of (at least one PHICH group, at least one set of PHICH sequences, HI bit, $b_0, b_1, \ldots, b_{M_{bit}}$ bit) for The information on the types of each subframe may be signaled to the terminal in association with the unlicensed band cell configuration information.

In addition to this, in the partial subframe, the information on the length of the corresponding subframe may consist of at least one combination of (at least one PHICH group, at least one set of PHICH sequences, HI bit, $b_0, b_1, \ldots, b_{M_{bit}}$ bit) by the similar method. For example, the number of symbols configuring the partial subframe by the HI bit for four sequences of the PHICH sequences 0, 1, 2, and 3 of the PHICH group 2 may be defined.

The information on the number of symbols configuring the subframe may also consist of at least one combination of (at least one PHICH group, at least one set of PHICH sequences, HI bit of the PHICH, $b_0, b_1, \ldots, b_{M_{bit}}$ bit). The combination information may also be signaled to the terminal in association with the unlicensed band cell configuration information.

In addition to this, the subframe length information of the unlicensed band transmission burst may be defined as the PHICH information of each subframe. For example, a PHICH specific information value of a first subframe of the unlicensed band transmission burst consisting of four continuous subframes is defined as 4 and a PHICH specific information value of a second subframe thereof is defined as 3, such that the remaining subframe length information of the unlicensed band transmission burst may be transmitted. Further, the subframe length of bursts remaining from the information bit scrambled with the PHICH sequences 0, 1, 2, and 3 of the PHICH group 3 may be defined. That is, the subframe length information of the unlicensed band transmission burst may consist of at least one combination of (at least one PHICH group, at least one set of PHICH sequences, HI bit, $b_0, b_1, \ldots, b_{M_{bit}}$ bit). The combination information may be signaled to the terminal in association with the unlicensed band cell configuration information.

As such, at least one information that may be defined by the PHICH may be transmitted along with each subframe by at least one combination of (at least one PHICH group, at least one set of PHICH sequences, HI bit, $b_0, b_1, \ldots, b_{M_{bit}}$ bit). Therefore, when the transmission is made as described above, the terminal may check whether each subframe is transmitted from the serving cell and check the type of the corresponding subframe and may recognize how may symbols the partial subframe includes and the remaining number of bursts of the current unlicensed band transmission burst.

Further, the number of symbols (hereinafter, CRS symbol) configuring the CRS of each subframe may also consist of at least one combination of (at least one PHICH group, at least one set of PHICH sequences, HI bit, $b_0, b_1, \ldots, b_{M_{bit}}$) by the similar method. The combination information may be signaled to the terminal in association with the unlicensed band cell configuration information. For example, if the value of the PHICH sequence 1 of the PHICH group 1 is 1, the CRS symbol of the corresponding subframe may be defined as being configured of one symbol. Further, the number 1, 2, 4, 6 of CRS symbols may each be defined by the HI bit for four sequences of the PHICH sequences 0, 1, 2, and 3 of the PHICH group 1. As another example, when the number of information bits for all the possible combinations is x, the number of CRS symbols may be designated as x PHICH sequences. In this case, the type of the subframe may also be designated from the CRS symbol.

Information on whether the current subframe is the last subframe, the last normal subframe, or the partial subframe, or the information on the number of symbols configuring the last subframe may be configured by at least one combination of (at least one PHICH group, at least one set of PHICH sequences, HI bit, $b_0, b_1, \ldots, b_{M_{bit}}$ bit) by the similar method. For example, the information on whether the current subframe is the last subframe may be signaled by the HI bit for the PHICH sequence 0 of the PHICH group 1. Alternatively, the information on whether the current subframe is the subframe consisting of the TTI of 1 ms or the partial subframe may be signaled by the HI bit for the PHICH sequences 0 and 1 of the PHICH group 1, along with whether the current subframe is the last subframe. Alternatively, the number of symbols configuring the last subframe may be signaled by using some of the HI bit for the PHICH sequence 0 of the PHICH group 2. That is, in the case of the last subframe, the subframe structure, or in the case of the partial subframe, the information on the number of symbols may consist of at least one combination of (at least one PHICH group, at least one set of PHICH sequences, HI bit, $b_0, b_1, \ldots, b_{M_{bit}}$ bit). The combination information may be signaled to the terminal in association with the unlicensed band cell configuration information.

The subframe length information of the unlicensed band transmission burst to be subsequently transmitted may be defined as the PHICH information of each subframe. When the unlicensed band transmission burst to be subsequently transmitted consists of ten continuous subframes, a PHICH specific information value of at least one subframe of the current unlicensed band transmission burst is set to be 10, and thus the subframe length information of the subsequent unlicensed band transmission burst may be signaled. For example, a subframe length of the subsequent burst may be designated from information bit scrambled with PHICH sequences 0, 1, 2, and 3 of PHICH group 3. That is, the subframe length information of the unlicensed band transmission burst to be subsequently transmitted may consist of at least one combination of (at least one PHICH group, at least one set of PHICH sequences, HI bit, $b_0, b_1, \ldots, b_{M_{bit}}$ bit). The combination information may be signaled to the terminal in association with the unlicensed band cell configuration information.

After the current unlicensed band transmission burst, the subframe length information that the terminal does not perform the (E)PDCCH monitoring on may be defined as the PHICH information of each subframe. When the monitoring of the terminal is not required for next 15 continuous subframes after the current unlicensed band transmission burst is received, the PHICH specific information value at the last subframe of the current unlicensed band transmission burst may be signaled as 15. For example, the subframe length for which the monitoring is not required may be designated from the information bit scrambled with the PHICH sequences 0, 1, 2, and 3 (or up to 8 sequences) of the PHICH group 3. That is, the subframe length information that the terminal does not perform the (E)PDCCH monitoring on until the subsequent unlicensed band transmission burst may consist of at least one combination of (at least one PHICH group, at least one set of PHICH sequences, HI bit, $b_0, b_1, \ldots, b_{M_{bit}}$ bit). The combination information may be signaled to the terminal in association with the unlicensed band cell configuration information.

Whether at least one of the CSI-RS and the CSI-IM is configured in the current subframe may be defined as the PHICH information. For example, whether at least one of the CSI-RS and the CSI-IM is configured may be designated from the information bit scrambled with the PHICH sequence 5 of the PHICH group 1. That is, an antenna port including whether the CSI-RS or the CSI-IM is configured and CSI process information may consist of at least one combination of (at least one PHICH group, at least one set of PHICH sequences, HI bit of the PHICH, $b_0, b_1, \ldots, b_{M_{bit}}$ bit). The combination information may be signaled to the terminal in association with the unlicensed band cell configuration information.

The transmit power information of the CRS or CSI configured in the current unlicensed band transmission burst may be signaled to the PHICH. For example, the transmit power information of the CRS or CSI may be designated from the information bit scrambled with the PHICH sequences 0, 1, 2, and 3 (or up to 8 sequences) of the PHICH group 3. That is, the transmit power information of the CRS or CSI may consist of at least one combination of (at least one PHICH group, at least one set of PHICH sequences, HI bit of the PHICH, $b_0, b_1, \ldots, b_{M_{bit}}$ bit). The combination information may be signaled to the terminal in association with the unlicensed band cell configuration information.

As such, at least one information that may be defined by the PHICH may be transmitted along with each subframe by at least one combination of (at least one PHICH group, at least one set of PHICH sequences, HI bit of PHICH, $b_0, b_1, \ldots, b_{M_{bit}}$ bit). Therefore, when the transmission is made as described above, the terminal may check whether each subframe is transmitted from the serving cell, check the type of the corresponding subframe, and may recognize at least one of information such as how many symbols the partial subframe includes, the remaining number of subframes of the current burst, the number of subframes of the subsequent burst, whether the CSI-RS/CSI-IM is configured, the transmit power information of the CRS/CSI-RS, and the number of subframes that the terminal does not perform the (E)PD-CCH monitoring on.

Next, the signaling method using the U-RNTI will be described.

The CRC of the PDCCH or the (E)PDCCH including the DCI for transmitting the system information of the corresponding cell in the unlicensed band cell may be masked with the U-RNTI meeting the specific purpose. In this case, the corresponding (E)PDCCH may use the resource of the cell common search space or may be transmitted to the UE-specific search space resource designated depending on the U-RNTI value. The terminal may demodulate the DCI using the U-RNTI defined depending on the specific purpose to check the resource transmitted from the serving cell. Further, the subframe type information may be transmitted, being included in the corresponding DCI. In this case, the DCI does not include the PDSCH related information and may include only the subframe information or unlicensed band transmission burst information. Herein, the subframe information may include the information such as the subframe type, the number of symbols of the subframe having the TTI shorter than the TTI of 1 ms, and the number of CRS symbols transmitted to the symbol after the PDCCH. The unlicensed band transmission burst information may include the information on the remaining number of subframes of the corresponding burst, the number of subframes of the subsequent burst, the uplink configuration information, whether the CSR/RS-CSI-IM is configured, the CRS/CSI-RS power information, or the like.

Finally, the signaling method using the DCI information will be described.

The signaling method using the DCI information is a method using the DCI designating the SIB in the cell common search space of the unlicensed band PDCCH or the unlicensed band SIB designated by the corresponding DCI. The terminal demodulates the DCI to check whether the corresponding subframe is transmitted from the serving cell. In addition to this, the terminal may also use the information included in the DCI or acquire the corresponding subframe and the unlicensed band transmission burst information from the unlicensed band related SIB transmitted to the PDSCH designated by the corresponding DCI. The subframe information may include the information such as the subframe type, the number of symbols of the partial subframe, and the number of symbols transmitted to the symbol after the PDCCH. The unlicensed band transmission burst information may include the information on the remaining number of subframes of the corresponding burst, the number of subframes of the subsequent burst, the uplink configuration information, whether the CSR/RS-CSI-IM is configured, the CRS/CSI-RS transmit power information, or the like.

Figure 18:
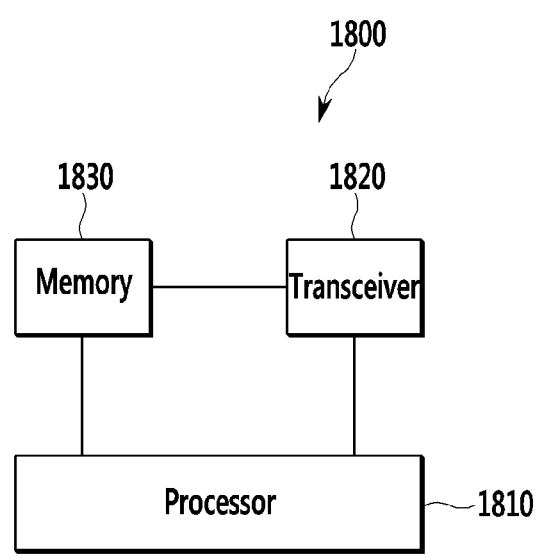
FIG. 18 is a diagram illustrating an apparatus for configuring a frame of an unlicensed band according to an exemplary embodiment of the present invention.

FIG. 18 is a diagram illustrating an apparatus for configuring a frame of an unlicensed band according to an exemplary embodiment of the present invention.

Referring to FIG. 18, an apparatus 1800 for configuring a frame of an unlicensed band includes a processor 1810, a transceiver 1820, and a memory 1830. The apparatus 1800 for configuring a frame of an unlicensed band may be implemented in the base station or the terminal.

The processor 1810 assesses the occupancy state of the channel of the unlicensed band to configure the unlicensed band transmission burst continuously transmitting the plurality of subframes and generates the signaling information for notifying the information of subframes of the unlicensed band transmission burst. As described with reference to FIGS. 9 to 17, the processor 1810 may use the normal subframe in the licensed band and the subframe defined in the unlicensed band to configure the unlicensed band transmission burst.

The transceiver 1820 is connected to the processor 1810 to transmit and receive a wireless signal.

The memory 1830 stores instructions which are performed by the processor 1810 or loads instructions from a storage device (not illustrated) and temporarily stores the instructions and the processor 1810 may execute the instructions which are stored or loaded in the memory 1830. Further, the memory 1830 may store the information associated with the operation of the processor 1810.

The processor 1810 and the memory 1830 are connected to each other through a bus (not illustrated) and an input/output interface (not illustrated) may also be connected to the bus. In this case, the transceiver 1820 is connected to the input/output interface and peripheral devices such as an input device, a display, a speaker, and a storage device may be connected to the input/output interface.

According to an embodiment of the present invention, it is possible to flexibly configure the structure of the frame of the unlicensed band cell by providing the signaling to enable the terminal to recognize various types of subframe structures of the unlicensed band and the corresponding subframe structure.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for configuring a frame of an unlicensed band at a communication node, comprising:
configuring an unlicensed band transmission burst in consideration of an occupancy state of a channel of the unlicensed band;
transmitting the unlicensed band transmission burst through the unlicensed band; and
signaling information of subframes configuring the unlicensed band transmission burst,
wherein the unlicensed band transmission burst includes a plurality of continuous subframes, and at least one of the plurality of subframes is a subframe of a different type from the remaining subframes; and
wherein the information includes at least one of the number of symbols including CRS configured in the subframe, information on a last subframe of the unlicensed band transmission burst, the number of symbols configuring a partial subframe, the number of subframes of the unlicensed band transmission burst, the number of subframes in which a control channel region is not monitored after the unlicensed band transmission burst currently transmitted expires, the number of remaining subframes of an unlicensed band transmission burst currently transmitted, the number of subframes of a subsequent unlicensed band transmission burst, whether a channel state information-reference signal (CSI-RS)/channel state information-interference measurement (CSI-IM) is configured, and transmit power of the CRS/CSI-RS.

2. The method of claim 1, further comprising: adding an unlicensed band signal to a start location of the unlicensed band transmission burst.

3. The method of claim 1, wherein: the at least one subframe includes a partial subframe having a time length shorter than that of the remaining subframes.

4. The method of claim 3, wherein: the remaining subframes include a plurality of symbols in a time domain, and the partial subframe does not transmit a signal for a part of first or last time in the time length of the remaining subframes.

5. The method of claim 1, wherein: the at least one subframe is an uplink subframe and the remaining subframes are a downlink subframe.

6. The method of claim 1, wherein: the at least one subframe includes a subframe in which a symbol in which a cell-specific reference signal (CRS) is present and a symbol in which the cell-specific reference signal (CRS) is not present are mixed.

7. The method of claim 1, wherein: the at least one subframe includes a subframe in which an unlicensed band discovery reference signal (DRS) is multiplexed with a physical downlink shared channel (PDSCH).

8. The method of claim 1, wherein: the at least one subframe includes an uplink subframe consisting of only a physical uplink control channel (PUCCH).

9. The method of claim 1, wherein: the at least one subframe includes a subframe in which primary synchronization signal (PSS)/a secondary synchronization signal (SSS) are included.

10. The method of claim 1, wherein: the signaling includes transmitting the information using at least one of a physical HARQ indicator channel (PHICH) defined for uplink hybrid automatic repeat reQuest feedback, an unlicensed cell-radio network temporary identifier (U-RNTI) associated with an unlicensed band cell, and downlink control information (DCI).

11. The method of claim 10, wherein: the signaling includes transmitting the information by a combination of at least one of a PHICH group, a PHICH sequence, and a PHICH information bit.

12. An apparatus for configuring a frame of an unlicensed band at a communication node, comprising:
a processor assessing an occupancy state of a channel of the unlicensed band to configure an unlicensed band transmission burst continuously transmitting a plurality of subframes and generating signaling information for informing information of subframes of the unlicensed band transmission burst; and
a transmitting/receiving device connected to a network to transmit the unlicensed band transmission burst and signaling information,
wherein at least one of the plurality of subframes is a subframe of a different type from the remaining subframes, and
wherein: the signaling information includes at least one of the number of symbols including a cell-specific reference signal (CRS) configured in the subframe, information on a last subframe of the unlicensed band transmission burst, the number of symbols configuring a partial subframe, the number of subframes of the unlicensed band transmission burst, the number of subframes in which a control channel region is not monitored after the unlicensed band transmission burst currently transmitted expires, the number of remaining subframes of an unlicensed band transmission burst currently transmitted, the number of subframes of a subsequent unlicensed band transmission burst, whether a channel state information-reference signal (CSI-RS)/channel state information-interference measurement (CSI-IM) is configured, and transmit power of the CRS/CSI-RS.

13. The apparatus of claim 12, wherein: the at least one subframe includes a downlink subframe including a synchronization signal and the remaining subframes include a downlink subframe not including the synchronization signal.

14. The apparatus of claim 12, wherein: the at least one subframe includes a downlink subframe in which an unlicensed band discovery reference signal (DRS) is multiplexed with a physical downlink shared channel (PDSCH) and the remaining subframes include a downlink subframe not including a synchronization signal.

15. The apparatus of claim 12, wherein: the at least one subframe is an uplink subframe and the remaining subframes are a downlink subframe.

16. The apparatus of claim 12, wherein: the at least one subframe includes a partial subframe having a time length shorter than that of the remaining subframes.

17. The apparatus of claim 12, wherein: the processor generates the signaling information using at least one of a physical HARQ indicator channel (PHICH) defined for uplink hybrid automatic repeat reQuest feedback, an unlicensed cell-radio network temporary identifier (U-RNTI) associated with an unlicensed band cell, and downlink control information (DCI).

\* \* \* \* \*